United States Patent
Itoh

(10) Patent No.: US 9,025,167 B2
(45) Date of Patent: May 5, 2015

(54) IMAGE PROCESSING APPARATUS AND METHOD

(75) Inventor: Naotsugu Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 13/141,557

(22) PCT Filed: Feb. 5, 2010

(86) PCT No.: PCT/JP2010/052107
§ 371 (c)(1),
(2), (4) Date: Jun. 22, 2011

(87) PCT Pub. No.: WO2010/101015
PCT Pub. Date: Sep. 10, 2010

(65) Prior Publication Data
US 2011/0255119 A1 Oct. 20, 2011

(30) Foreign Application Priority Data

Mar. 5, 2009 (JP) ................................. 2009-052556

(51) Int. Cl.
*H04N 1/00* (2006.01)
*G06K 15/00* (2006.01)
*G06F 21/60* (2013.01)
(Continued)

(52) U.S. Cl.
CPC .......... *H04N 1/40* (2013.01); *H04N 2201/0094* (2013.01); *H04N 2201/33357* (2013.01); *H04N 19/436* (2014.11)

(58) Field of Classification Search
CPC ................... H04N 1/00236; H04N 2201/0068
See application file for complete search history.

(56) References Cited

U.S. PATENT DOCUMENTS 6,342,950 B1 * 1/2002 Tabata et al. .................... 358/1.6
6,381,031 B1 * 4/2002 Mishima ....................... 358/1.15
7,680,345 B2   3/2010 Ito et al.

(Continued)

FOREIGN PATENT DOCUMENTS

CN   101340504 A   1/2009
JP   11-041429 A   2/1999

(Continued)

OTHER PUBLICATIONS

May 7, 2014 Chinese Office Action concerning corresponding Chinese Patent Application No. 201080010676.9.

*Primary Examiner* — Marivelisse Santiago Cordero
*Assistant Examiner* — Daryl Jackson
(74) *Attorney, Agent, or Firm* — Fitzpatrick, Cella, Harper & Scinto

(57) ABSTRACT

An image processing apparatus includes a first image processing unit having a fixed image processing function to perform image processing of image data. A second image processing unit has a fixed image processing function to perform image processing of image area data. A reconfigurable image processing unit is capable of having selectively, by reconfiguration of an architecture of the reconfigurable image processing unit, one of least a first image processing function for image processing of image data and a second image processing function for image processing of image area data. A control unite reconfigures the architecture of the reconfigurable image processing unit to have one of at least the first image processing function and a second image processing function on a basis of whether the image processing apparatus processes a color image or a monochrome image.

13 Claims, 24 Drawing Sheets

(51) Int. Cl.
*H04N 1/40* (2006.01)
*H04N 19/436* (2014.01)

(56) References Cited

U.S. PATENT DOCUMENTS

| | | |
|---|---|---|
| 7,821,656 B2 | 10/2010 | Ito et al. |
| 8,229,238 B2 * | 7/2012 | Matsumoto .................. 382/244 |
| 8,508,792 B2 | 8/2013 | Arakawa |
| 2001/0028397 A1 | 10/2001 | Nakamura |
| 2004/0131263 A1 * | 7/2004 | Kawamoto et al. ........... 382/232 |
| 2004/0190044 A1 * | 9/2004 | Hashimoto et al. .......... 358/1.15 |
| 2009/0296157 A1 * | 12/2009 | Misawa et al. ............... 358/3.24 |

FOREIGN PATENT DOCUMENTS

| | | |
|---|---|---|
| JP | 2001-285703 A | 10/2001 |
| JP | 2004-289556 A | 10/2004 |
| JP | 2006-067117 A | 3/2006 |
| JP | 2008-311792 A | 12/2008 |

* cited by examiner

FIG. 2

|  | SCANNER TRANSFER RATE (COMPONENTS/CYCLE) | |
|---|---|---|
|  | IMAGE DATA | IMAGE AREA DATA |
| CMYKZ | 8 (TWO PIXELS) | 2 (PIXELS) |
| KZ | 4 (FOUR PIXELS) | 4 (PIXELS) |

FIG. 3

|  | PRINTER RECEIVING RATE (COMPONENTS/CYCLE) | |
|---|---|---|
|  | IMAGE DATA | IMAGE AREA DATA |
| CMYKZ | 8 (TWO PIXELS) | 2 (PIXELS) |
| KZ | 4 (FOUR PIXELS) | 4 (PIXELS) |

FIG. 5

| | CAPABILITY | PERFORMANCE (COMPONENTS/CYCLE) | GATE SCALE [GATES] |
|---|---|---|---|
| IMAGE DATA DECOMPRESSION UNIT | IMAGE DATA DECOMPRESSION | 4 (ONE PIXEL) | 100000 |
| IMAGE AREA DATA DECOMPRESSION UNIT | IMAGE AREA DATA DECOMPRESSION | 2 (TWO PIXELS) | 100000 |
| IMAGE/IMAGE AREA DATA DECOMPRESSION UNIT | IMAGE DATA DECOMPRESSION | 4 (ONE PIXEL) | 150000 |
| | IMAGE AREA DATA DECOMPRESSION | 2 (TWO PIXELS) | |

FIG. 6

| | IMAGE DATA DECOMPRESSION UNIT | IMAGE AREA DATA DECOMPRESSION UNIT | VARIABLE DATA DECOMPRESSION UNIT | ENTIRE DECOMPRESSION UNIT |
|---|---|---|---|---|
| IMAGE DATA DECOMPRESSION PERFORMANCE | 4 | 0 | 4 | 8 |
| IMAGE AREA DATA DECOMPRESSION PERFORMANCE | 0 | 2 | 0 | 2 |

FIG. 7

| | IMAGE DATA DECOMPRESSION UNIT | IMAGE AREA DATA DECOMPRESSION UNIT | VARIABLE DATA DECOMPRESSION UNIT | ENTIRE DECOMPRESSION UNIT |
|---|---|---|---|---|
| IMAGE DATA DECOMPRESSION PERFORMANCE | 4 | 0 | 0 | 4 |
| IMAGE AREA DATA DECOMPRESSION PERFORMANCE | 0 | 2 | 2 | 4 |

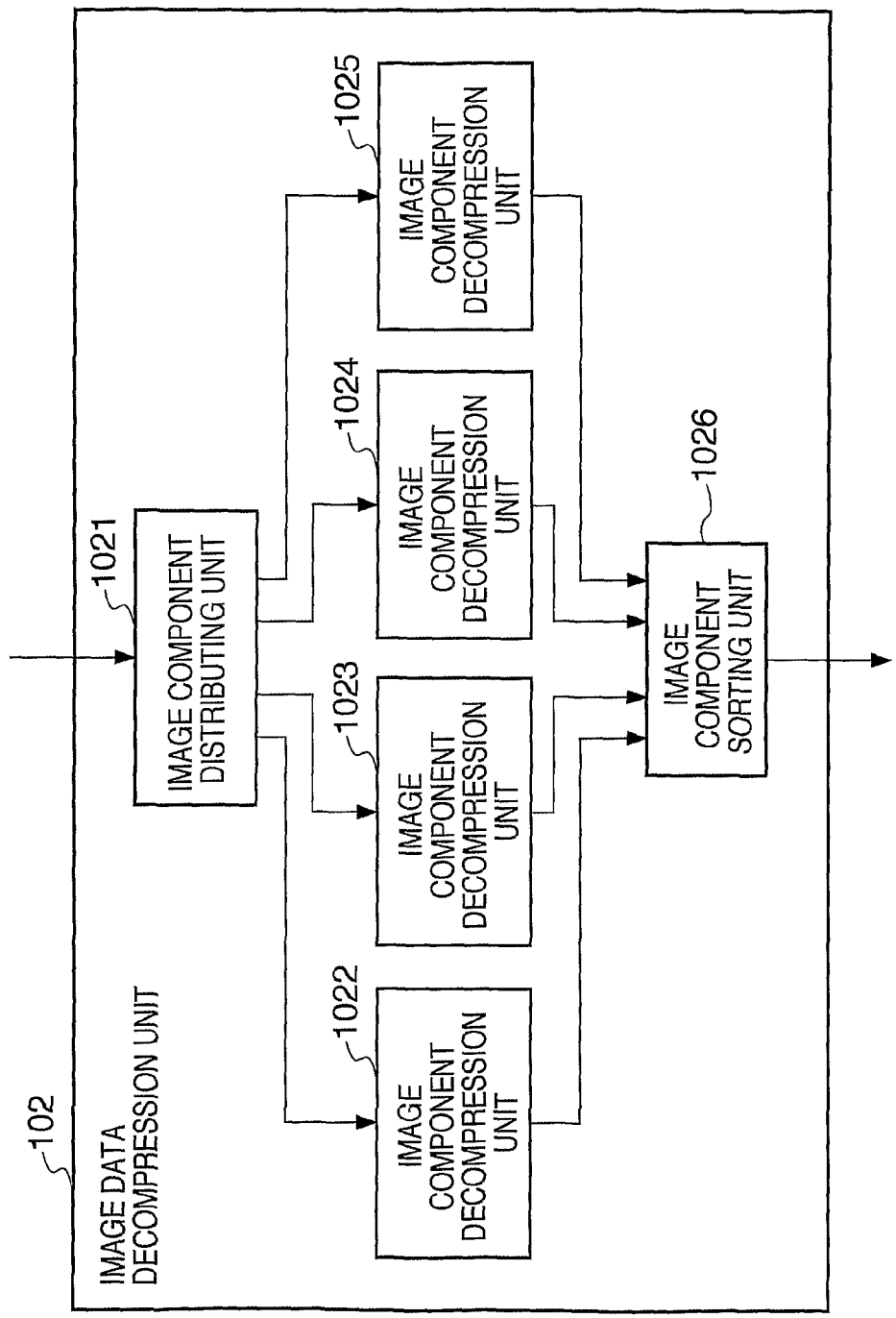

FIG. 11

| | CAPABILITY | PERFORMANCE (COMPONENTS/CYCLE) | GATE SCALE [GATES] |
|---|---|---|---|
| IMAGE DATA COMPRESSION UNIT | IMAGE DATA COMPRESSION | 4 (ONE PIXEL) | 100000 |
| IMAGE AREA DATA COMPRESSION UNIT | IMAGE AREA DATA COMPRESSION | 2 (TWO PIXELS) | 100000 |
| IMAGE/IMAGE AREA DATA COMPRESSION UNIT | IMAGE DATA COMPRESSION | 4 (ONE PIXEL) | 150000 |
| | IMAGE AREA DATA COMPRESSION | 2 (TWO PIXELS) | |

FIG. 12

| | IMAGE DATA COMPRESSION UNIT | IMAGE AREA DATA COMPRESSION UNIT | VARIABLE DATA COMPRESSION UNIT | ENTIRE COMPRESSION UNIT |
|---|---|---|---|---|
| IMAGE DATA COMPRESSION PERFORMANCE | 4 | 0 | 4 | 8 |
| IMAGE AREA DATA COMPRESSION PERFORMANCE | 0 | 2 | 0 | 2 |

FIG. 13

| | IMAGE DATA COMPRESSION UNIT | IMAGE AREA DATA COMPRESSION UNIT | VARIABLE DATA COMPRESSION UNIT | ENTIRE COMPRESSION UNIT |
|---|---|---|---|---|
| IMAGE DATA COMPRESSION PERFORMANCE | 4 | 0 | 0 | 4 |
| IMAGE AREA DATA COMPRESSION PERFORMANCE | 0 | 2 | 2 | 4 |

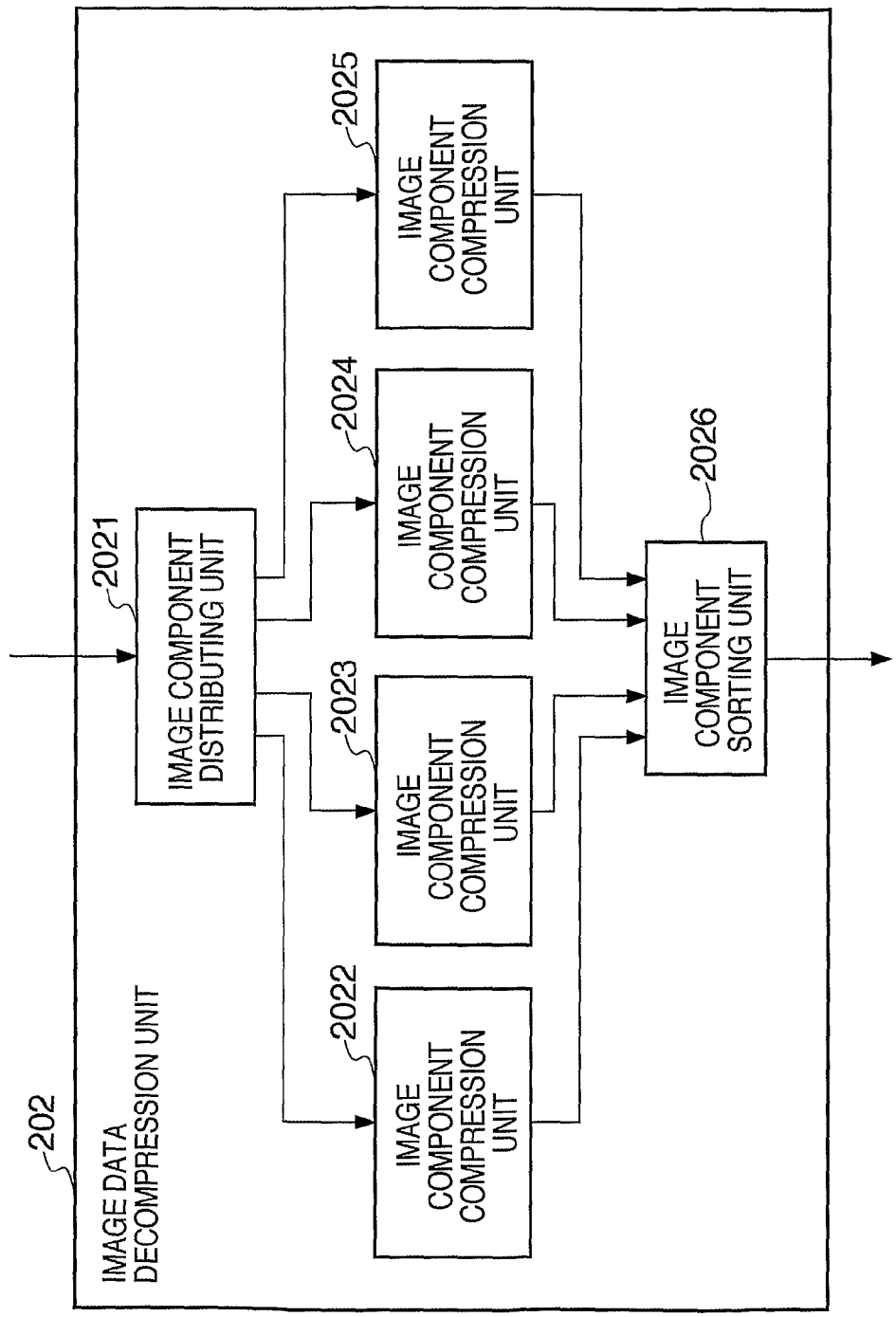

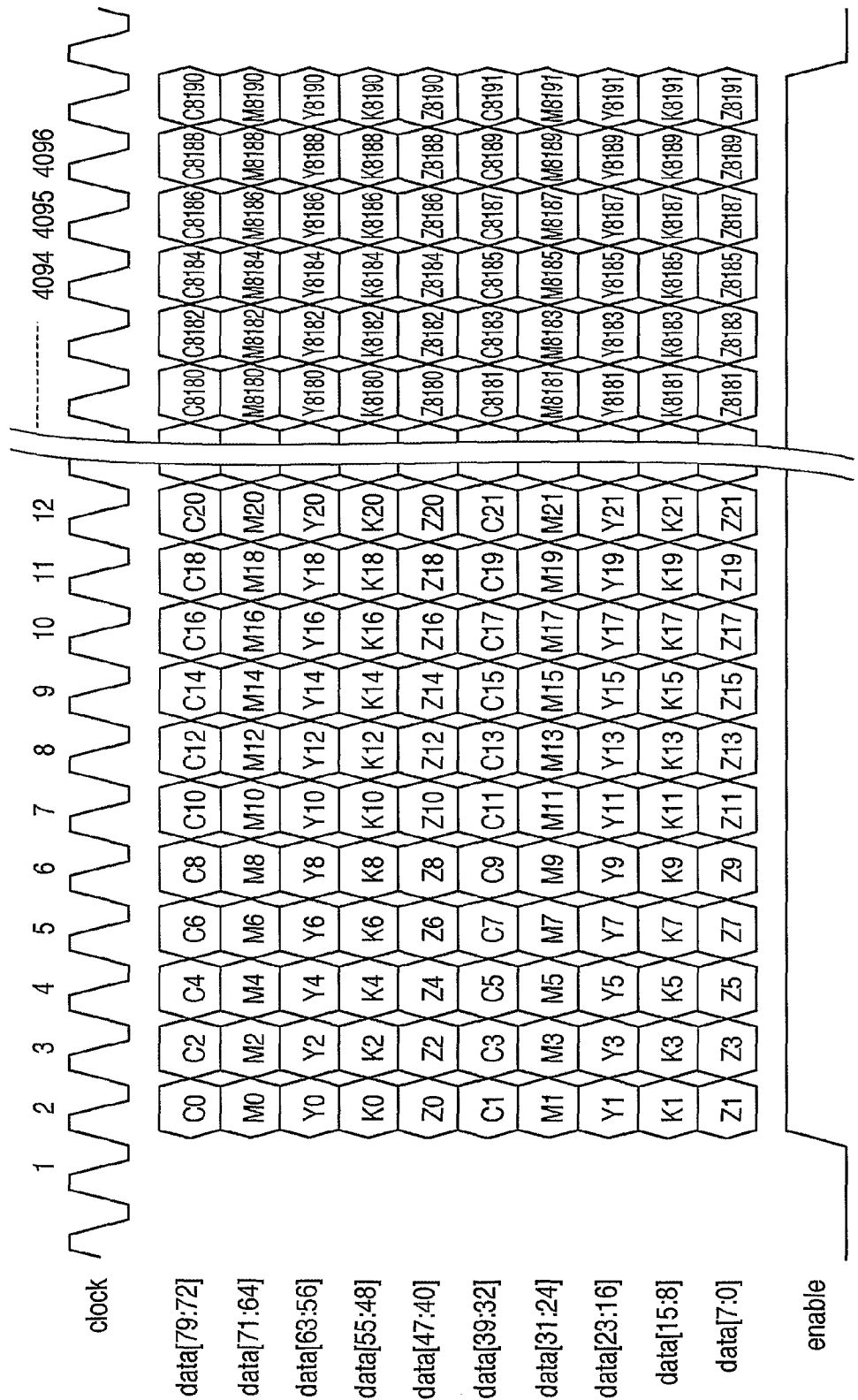

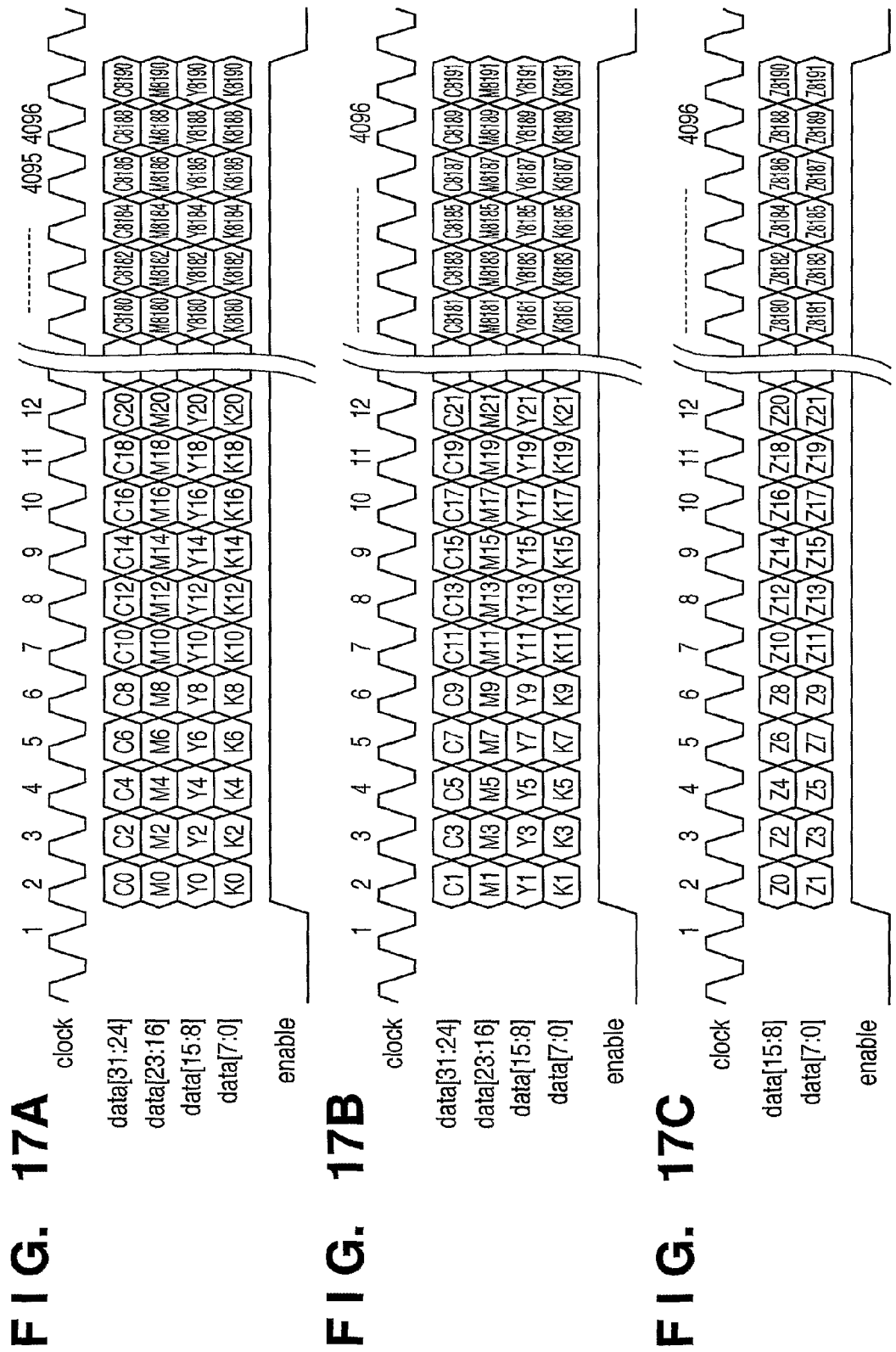

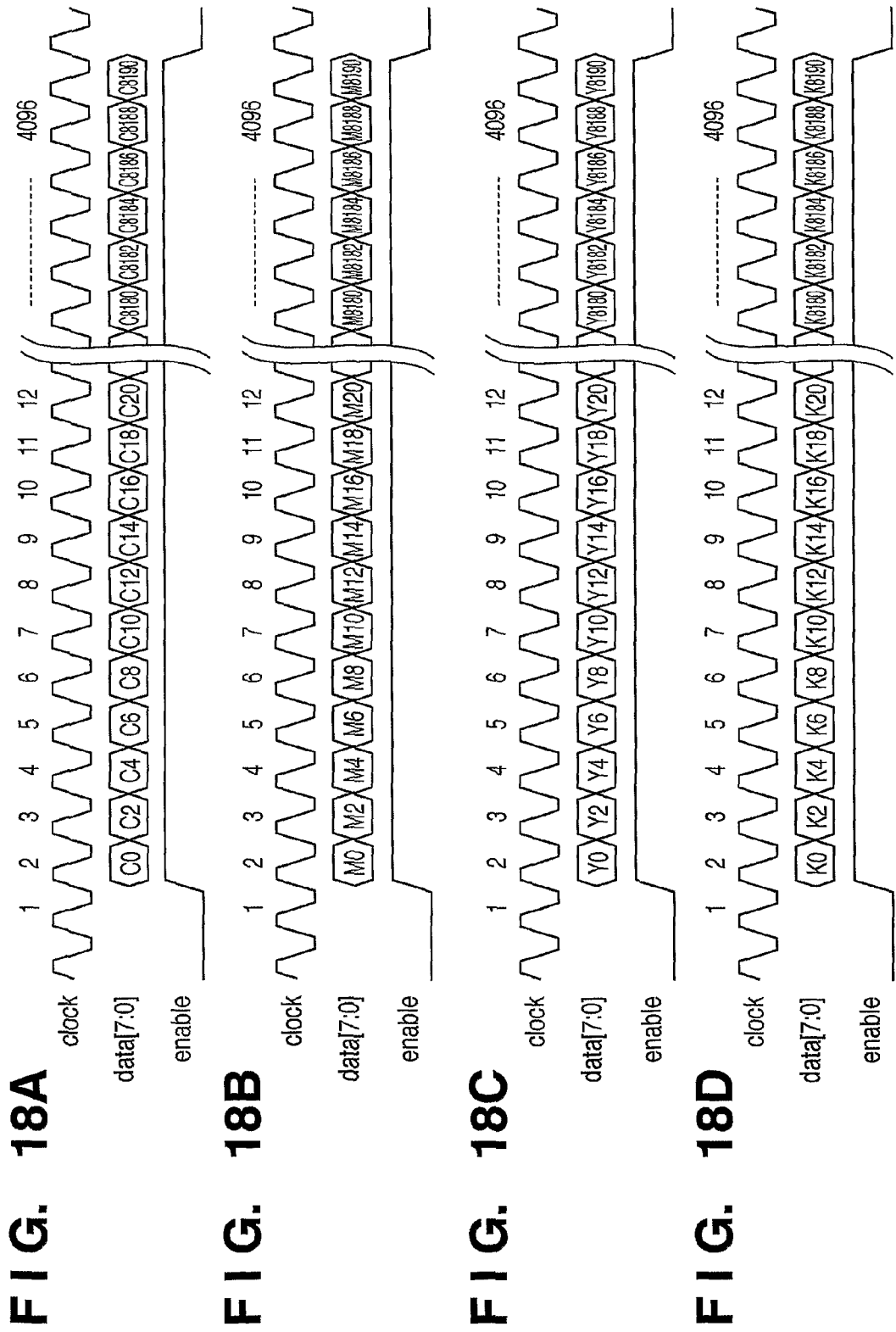

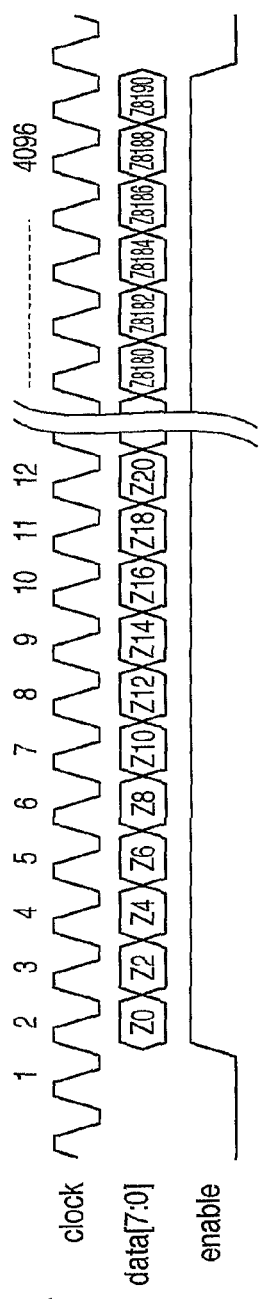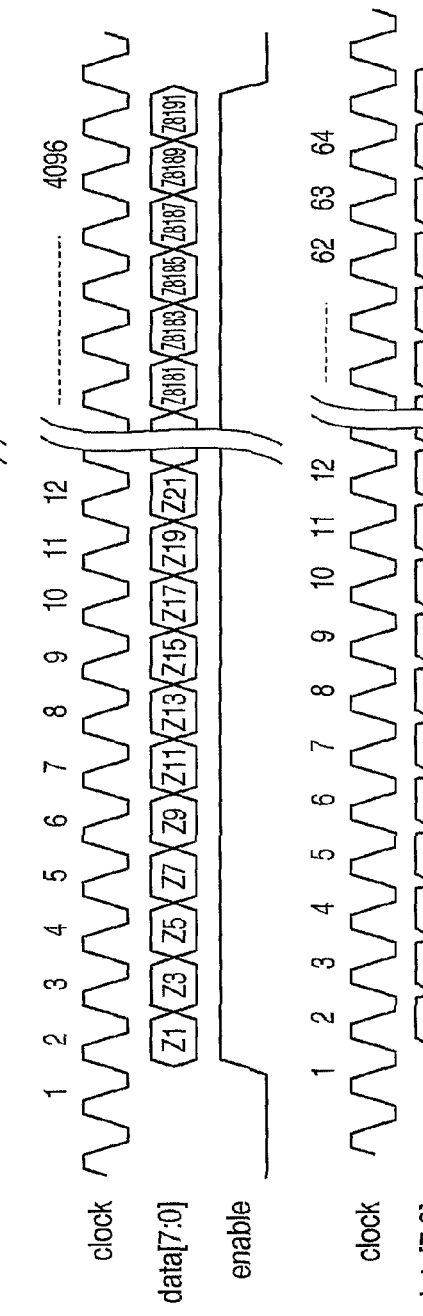

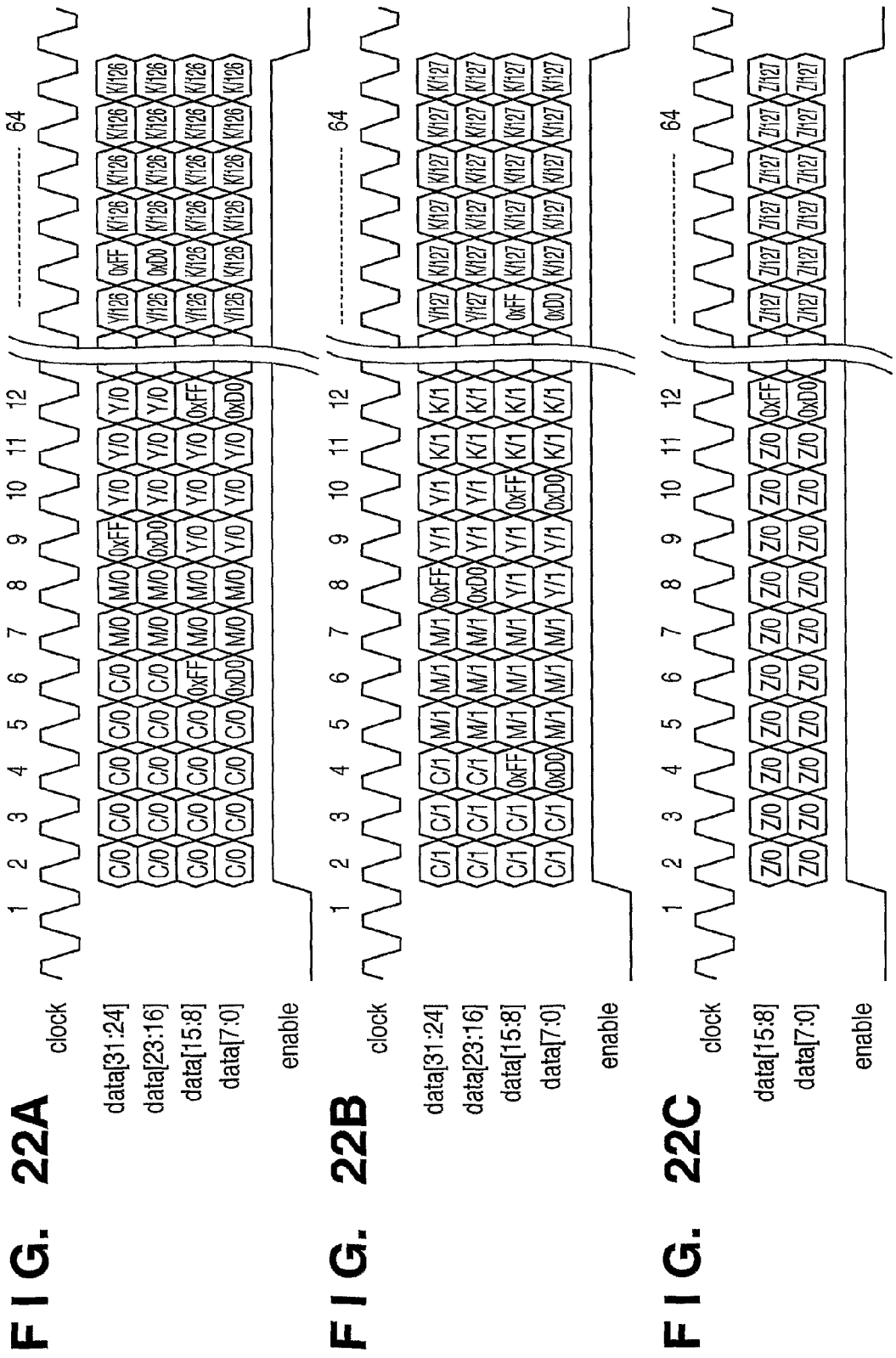

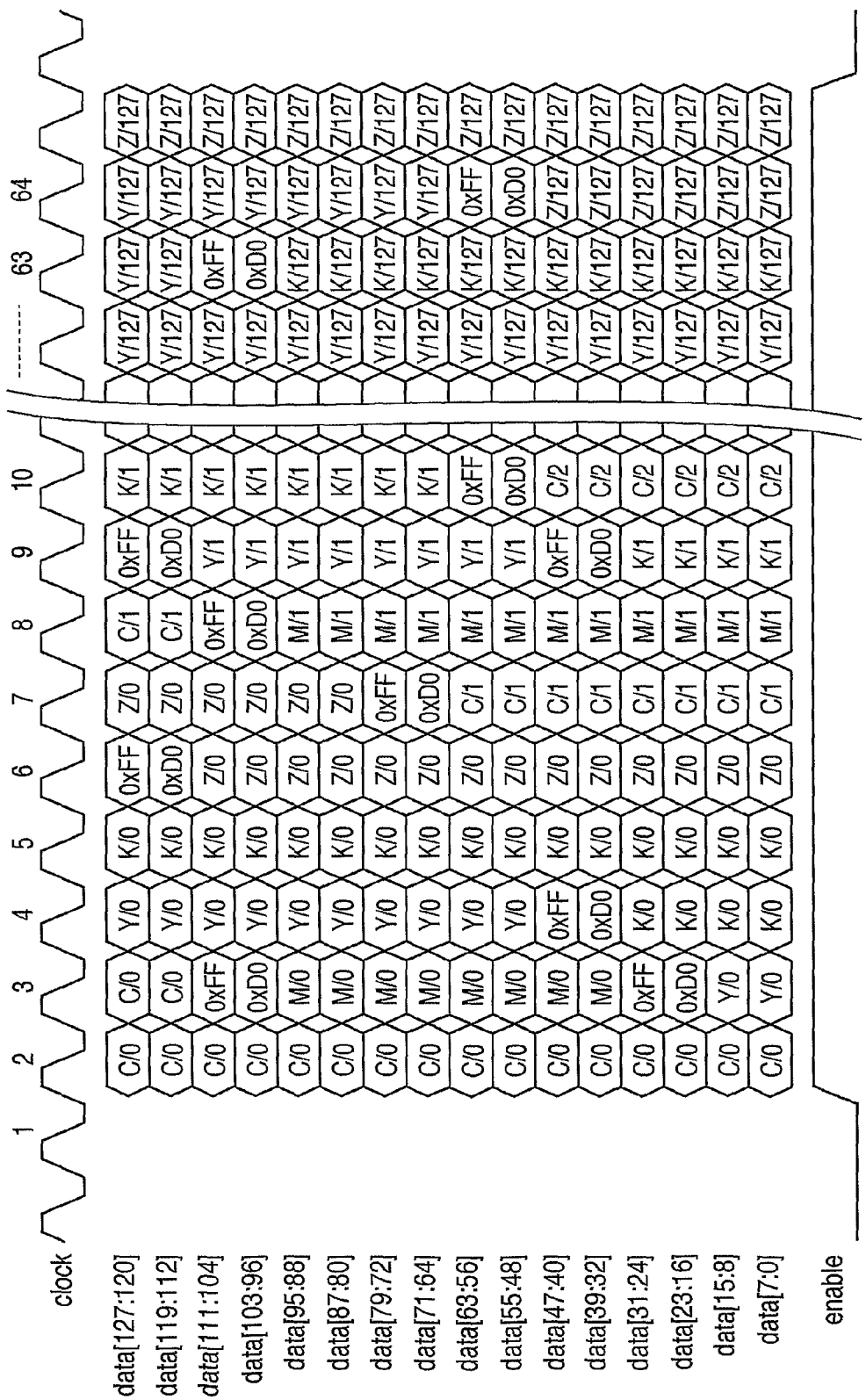

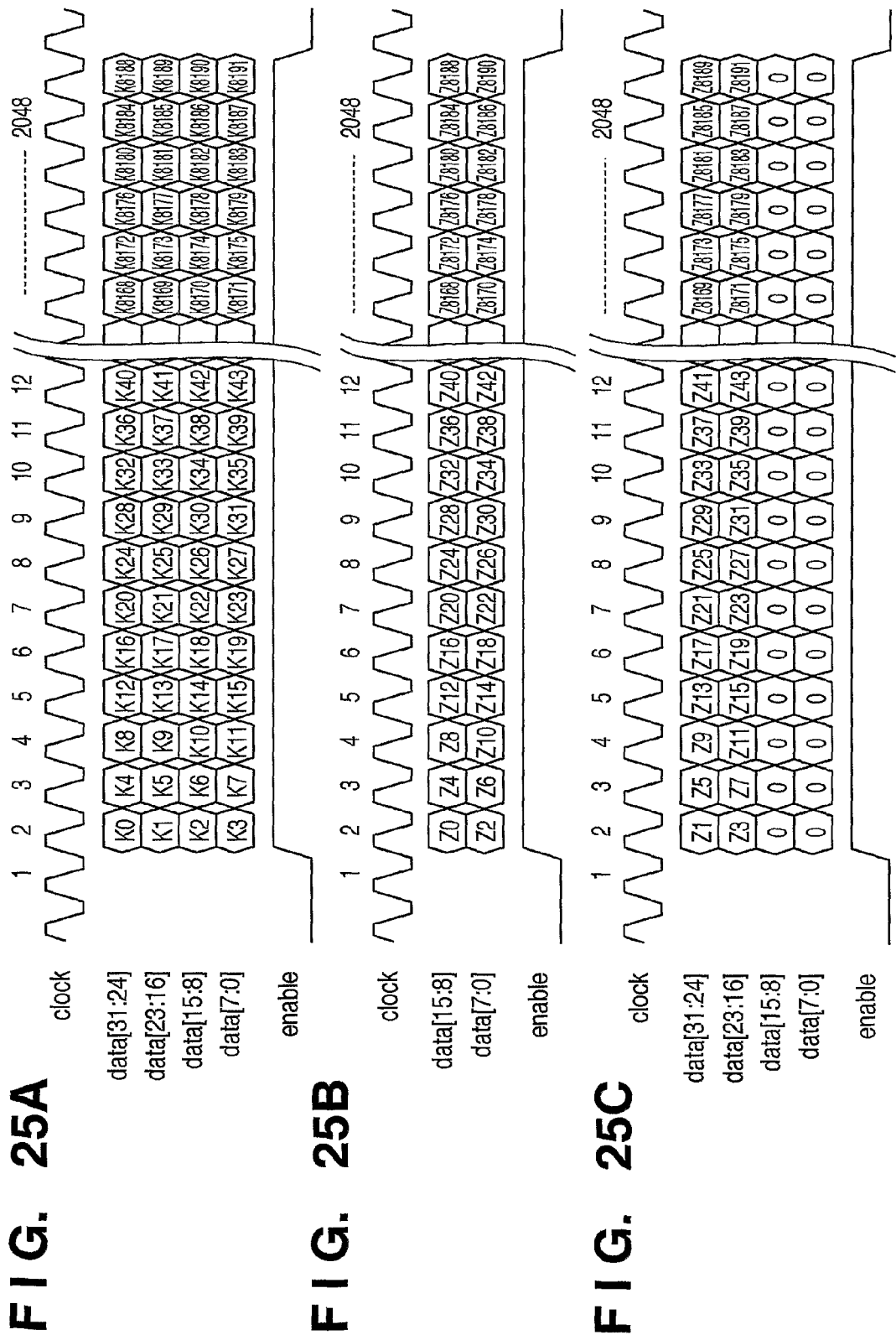

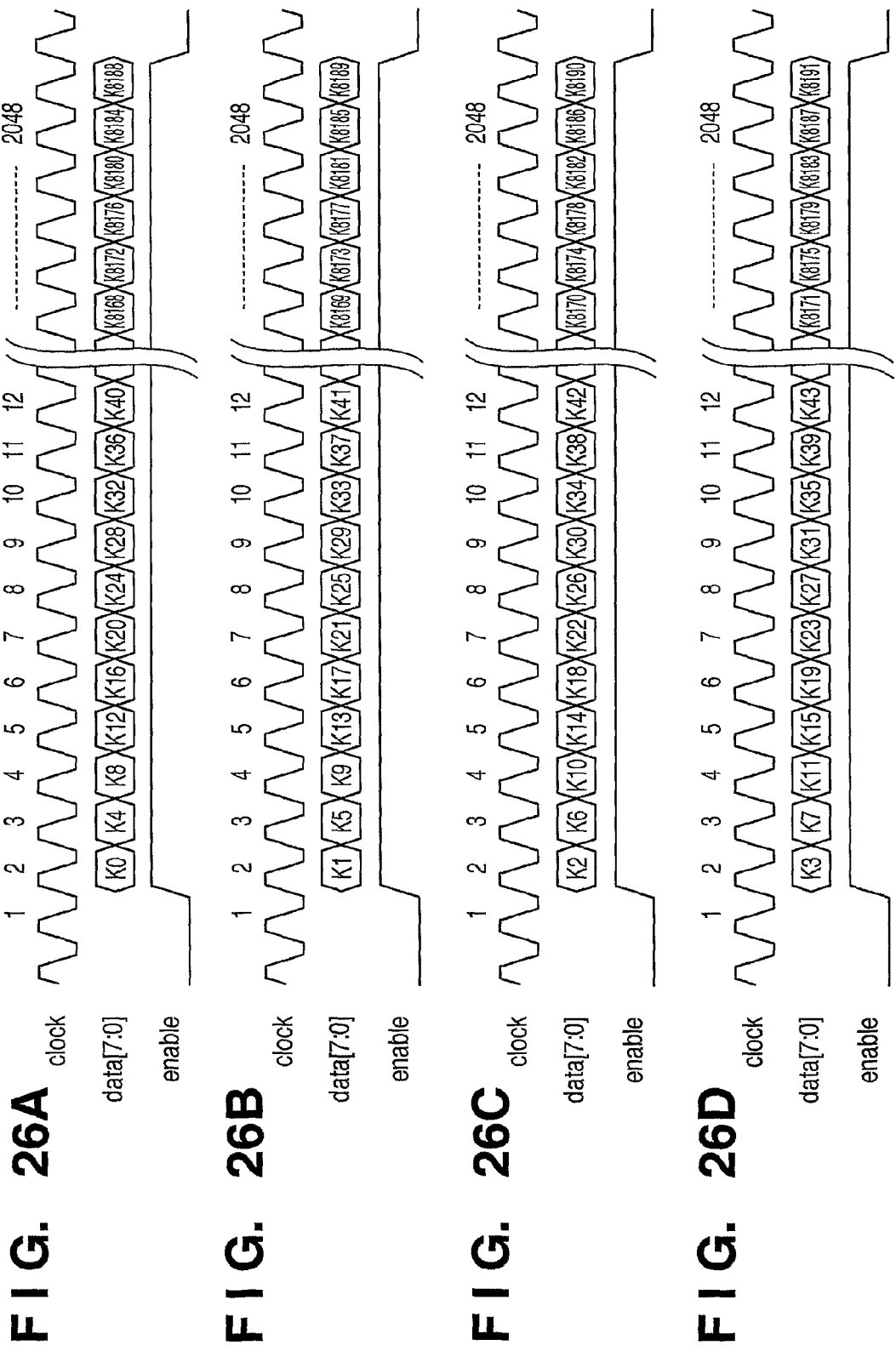

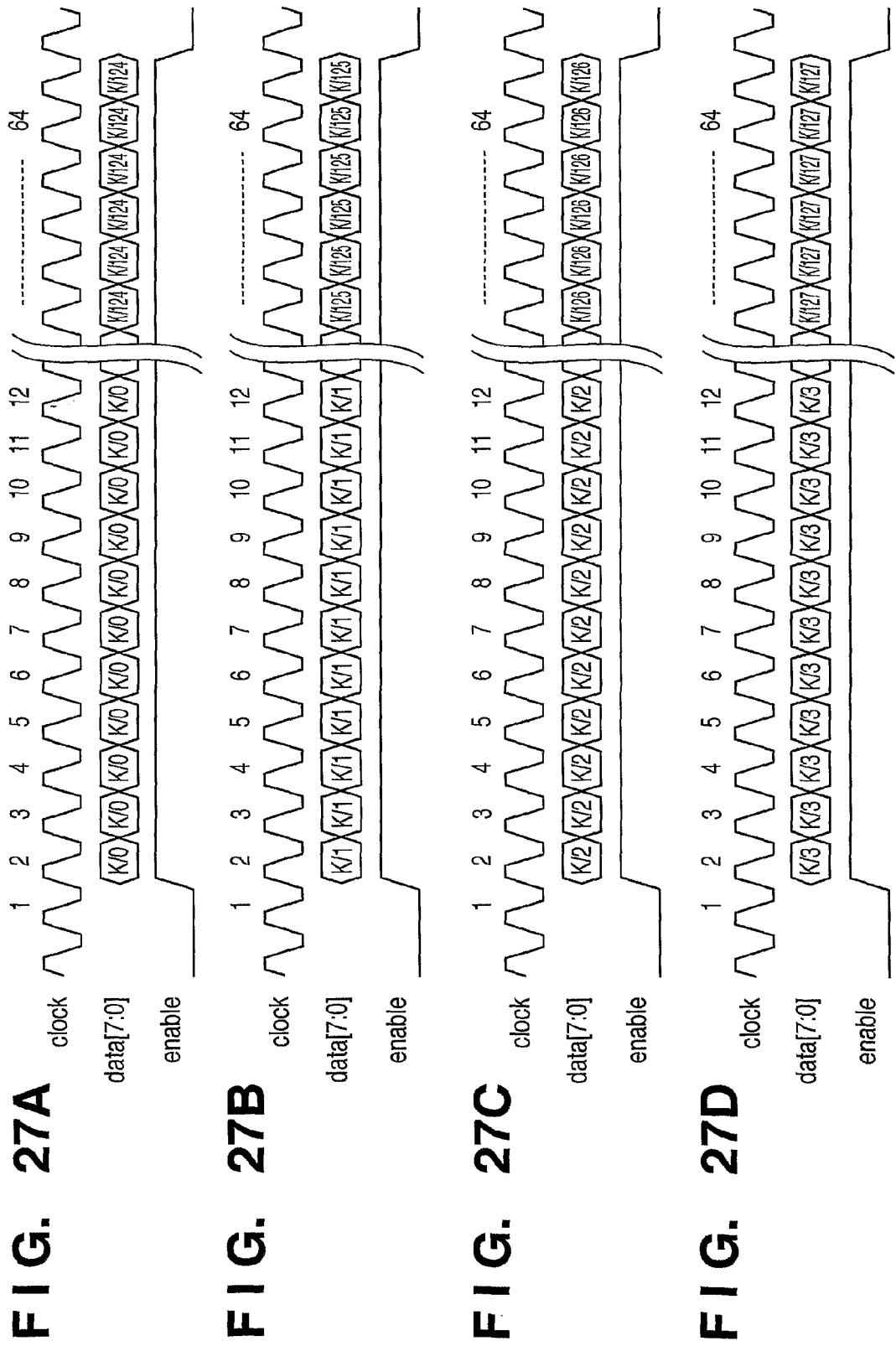

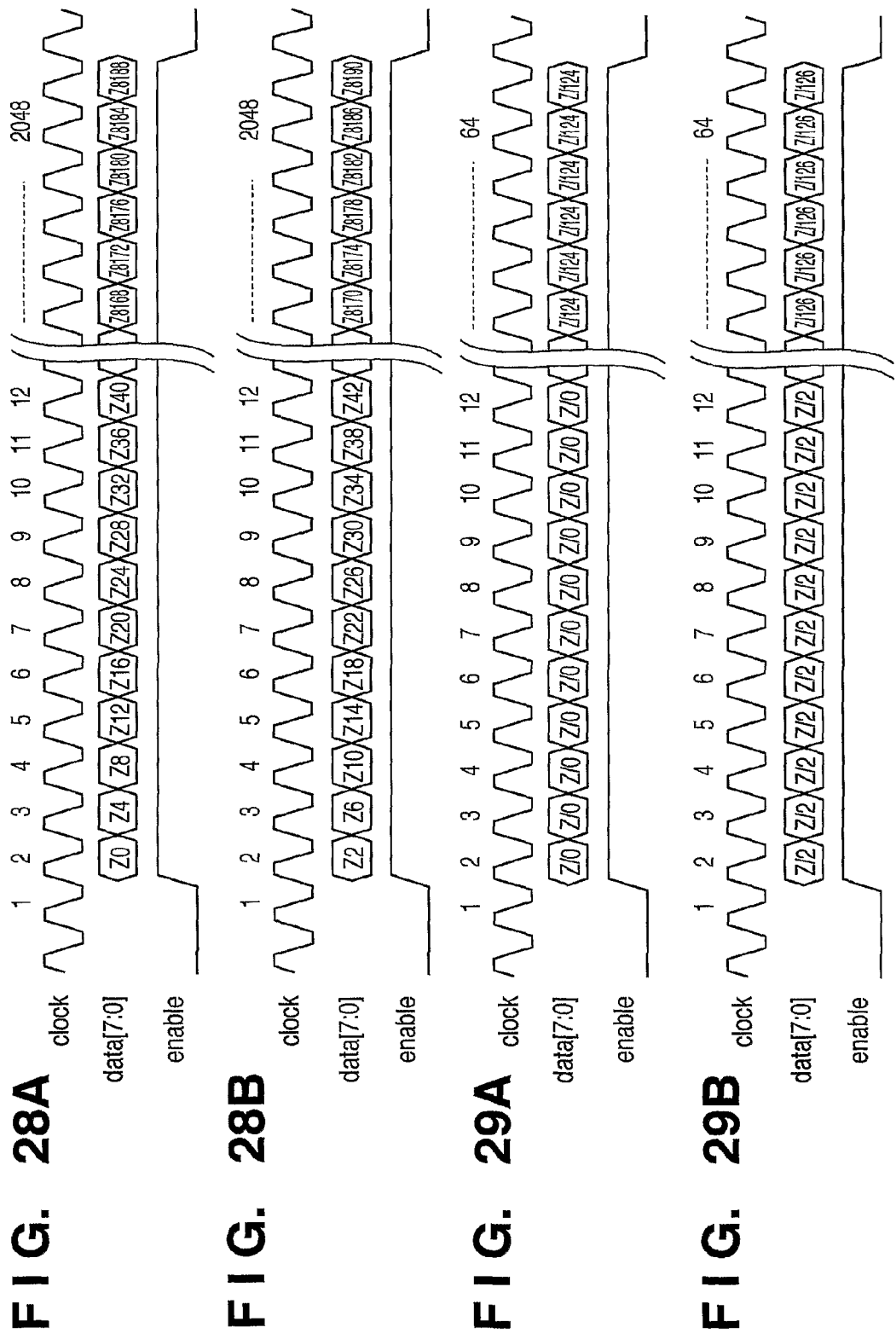

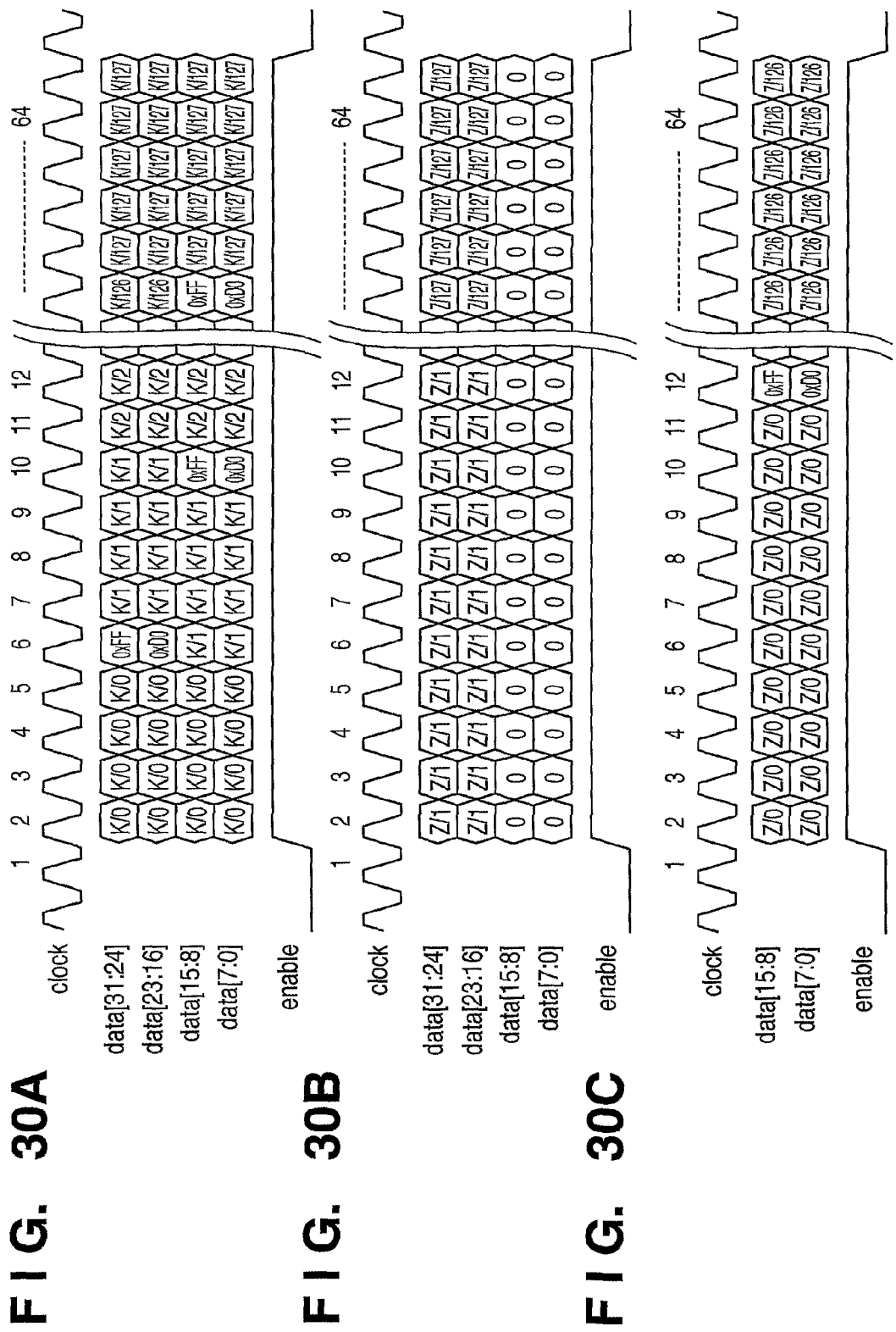

IMAGE PROCESSING APPARATUS AND METHOD

TECHNICAL FIELD

The present invention relates to an image processing apparatus and image processing method capable of executing a plurality of image processes in parallel.

BACKGROUND ART

An MFP (multi function peripheral) includes a scanner and a printer and has a capability of reading an original and a capability of receiving data from a PC or the like and printing it. An image processing apparatus incorporated in the MFP to transfer image data to/from an input/output device such as a scanner or printer must have a capability for data processing exceeding the image data transfer rate of the input/output device. One reason for this is that the input/output device executes original reading or print processing for each page: once it starts processing, it cannot stop the operation until the entire page has been processed. If the input/output device has no page buffer which is a factor for an increase in cost, it is necessary to transfer image data of at least one page in synchronism with the operation of the device during the operation of the device. For this reason, the image processing apparatus connected to these devices must satisfy the data transfer conditions. Since the data transfer conditions change greatly depending on the operation rate of the device, the resolution of image data, the type of color space, and the like, the image processing apparatus must have a capability for data processing that satisfies all the data transfer conditions. Under these circumstances, the image processing apparatus is designed in consideration of the required maximum capability for data processing. It is therefore difficult for the image processing apparatus to have, for example, a circuit scale, manufacturing cost, and power consumption less than or equal to desired values.

There has been proposed an image processing apparatus including a plurality of image processing units capable of executing a plurality of image processes in parallel. The image processing units process identical or associated data and combine their output data to realize desired image processing (Japanese Patent Laid-Open No. 2006-67117).

In this arrangement as well, all the image processing units need to have required capabilities for data processing. Moreover, depending on the characteristics of the image processes, a different maximum capability for data processing may be independently needed for each image processing unit.

When the image processing apparatus has a plurality of operation modes, the capability for data processing necessary for each image processing unit may independently change depending on the operation mode. In this case, each image processing unit is configured to have a capability for data processing necessary for an operation mode that requires the maximum required capability for data processing. Assume that a first image processing unit must have a maximum capability for data processing in the first operation mode, and a second image processing unit must have the maximum capability for data processing in a second operation mode. In this case, each of the first and second image processing units is designed to have the maximum capability for data processing in the corresponding operation mode.

However, if each image processing unit is designed in accordance with an operation mode that requires the maximum capability for data processing, the image processing units always have excess capabilities for data processing in other operation modes. This situation is conspicuous especially when the image processing apparatus includes many image processing units, and the image processing units need maximum capabilities for data processing in different operation modes because of the difference between characteristics. The excess capability of each image processing unit in the operation mode leads to an increase in the cost and power consumption of the overall apparatus. A demand therefore exists to reduce the cost and power consumption of the overall apparatus by further optimizing the capability of each image processing unit.

To achieve this object, a data processing device such as an FPGA (Field Programmable Gate Array) whose process can be altered may be used to realize an optimum image processing capability in each operation mode. For example, the maximum capability for data processing in each operation mode may be satisfied by forming each image processing unit using an FPGA and changing the process (of the FPGA) in accordance with the operation mode. However, using the data processing device whose process can be altered increases the cost as compared to use of a data processing device with a fixed process.

DISCLOSURE OF INVENTION

The present invention solves the problems of the prior art.

The present invention realizes a desired image processing capability by parallel processing of an image processing unit with a variable image processing capability and an image processing unit with an image processing capability equal to or lower than the required maximum capability. The present invention thus reduces the manufacturing cost of each image processing unit, thereby reducing the cost of the overall apparatus.

In order to achieve the above object, an image processing apparatus according to one aspect of the present invention has the following arrangement.

According to one aspect of the invention, the invention provides an image processing apparatus which processes input image data and outputs the processed image data, characterized by comprising: a plurality of image processing means including first image processing means with a fixed image processing capability and second image processing means with a variable image processing capability; instruction means for instructing the second image processing means to exhibit the image processing capability corresponding to an operation mode; and control means for supplying the image data to the plurality of image processing means, causing the plurality of image processing means to execute processing corresponding to the operation mode, receiving the image data processed by the plurality of image processing means, and sorting the received image data in accordance with the operation mode, wherein the control means realizes image processing corresponding to the operation mode using at least the first image processing means and the second image processing means.

Further features of the present invention will become apparent from the following description of exemplary embodiments (with reference to the attached drawings).

BRIEF DESCRIPTION OF DRAWINGS

FIG. 2 is a view for explaining the data output rate of a scanner in each operation mode;

FIG. 3 is a view for explaining the data receiving rate of a printer in each operation mode;

FIG. 5 is a view for explaining the performance per cycle and gate scale of each of an image data decompression unit, image area data decompression unit, and image/image area data decompression unit within the decompression unit;

FIG. 6 is a view for explaining the decompression performance of the data decompression units and the entire decompression unit in the CMYKZ mode of the decompression unit;

FIG. 7 is a view for explaining the decompression performance of the data decompression units and the entire decompression unit in the KZ mode of the decompression unit;

FIG. 8 is a block diagram showing the arrangement of the image data decompression unit within the decompression unit;

FIG. 11 is a view for explaining the performance per cycle and gate scale of each of an image data compression unit, image area data compression unit, and image/image area data compression unit within the compression unit;

FIG. 12 is a view for explaining the compression performance of the data compression units and the entire compression unit in the CMYKZ mode of the compression unit;

FIG. 13 is a view for explaining the compression performance of the data compression units and the entire compression unit in the KZ mode of the compression unit;

FIG. 14 is a block diagram showing the arrangement of the image data compression unit;

FIG. 16 is a timing chart showing the timing of image data/image area data output from the scanner to the compression unit in the CMYKZ mode;

FIGS. 17A, 17B, and 17C are timing charts for explaining the timings of image data transfer from a data input unit to the data compression units in the CMYKZ mode of the compression unit;

FIGS. 18A, 18B, 18C, and 18D are timing charts showing the timings of image data transfer from an image component distributing unit to image component compression units in the CMYKZ mode of the image data compression unit;

FIGS. 20A and 20B are timing charts showing the timings of image area data transfer from an image area distributing unit to image area compression units in the CMYKZ mode of the image area data compression unit;

FIGS. 21A and 21B are timing charts showing the timings of compressed image area data transfer from the image area compression units to an image area sorting unit in the CMYKZ mode of the image area data compression unit;

FIGS. 22A, 22B, and 22C are timing charts showing the timings of compressed data transfer from the data compression units to a data output unit in the CMYKZ mode of the compression unit;

FIG. 23 is a timing chart showing the timing of compressed image data/compressed image area data transfer from the compression unit 2 to a memory in the CMYKZ mode;

FIGS. 25A, 25B, and 25C are timing charts showing the timings of image data/image area data transfer from the data input unit to the data compression units in the KZ mode of the compression unit;

FIGS. 26A, 26B, 26C, and 26D are timing charts showing the timings of transfer of one pixel image data of K component from the image component distributing unit to the image component compression units in the KZ mode of the image data compression unit;

FIGS. 27A, 27B, 27C, and 27D are timing charts showing the timings of transfer of compressed image data of K component from the image component compression units to the image component sorting unit in the KZ mode of the image data compression unit;

FIGS. 28A and 28B are timing charts showing the timings of image area data transfer from the image area distributing unit to the image area compression units in the KZ mode of the image area data compression unit;

FIGS. 29A and 29B are timing charts showing the timings of compressed image area data transfer from the image area compression units to the image area sorting unit in the KZ mode of the image area data compression unit;

FIGS. 30A, 30B, and 30C are timing charts showing the timings of compressed data transfer from the data compression units to the data output unit in the KZ mode of the compression unit.

BEST MODE FOR CARRYING OUT THE INVENTION

The embodiments of the present invention will now be described in detail with reference to the accompanying drawings. Note that the present invention is determined by the scope of claims and is not limited by the following embodiments. Not all combinations of features described in the embodiments are necessarily essential in the present invention.

Figure 1:
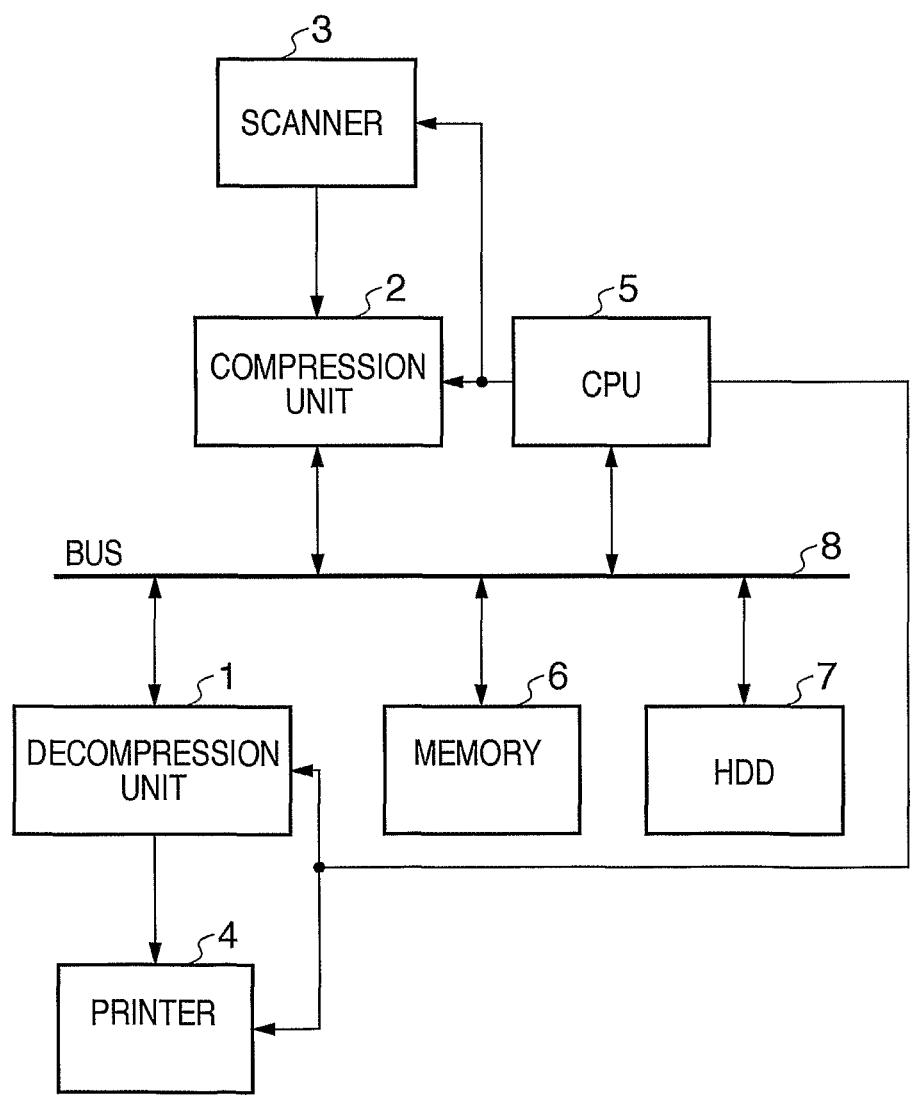
FIG. 1 is a block diagram showing the overall arrangement of an image processing system.

FIG. 1 is a block diagram showing the overall arrangement of an image processing system according to an embodiment of the present invention.

A decompression unit 1 receives, via a bus 8, compressed image data and compressed image area data stored in a memory 6, decompresses the received data to generate image data and image area data, and outputs them to a printer 4. The decompression unit 1 is connected to a CPU 5 so as to operate while changing the operation mode under the control of the CPU 5. The decompression unit 1 has a CMYKZ mode and a KZ mode as the operation modes, which correspond to decompression of a color image and decompression of a monochrome image, respectively.

A compression unit 2 compresses image data and image area data received from a scanner 3 to generate compressed image data and compressed image area data. The compressed image data and compressed image area data are stored in the memory 6 via the bus 8. The compression unit 2 is connected to the CPU 5 so as to be able to change the operation mode under the control of the CPU 5. The compression unit 2 has a CMYKZ mode and a KZ mode as the operation modes, which correspond to compression of a color image and compression of a monochrome image, respectively.

The scanner 3 reads an original placed on an original table, using a CCD sensor to generate image data. The scanner 3 also generates image area data based on the read image data, and supplies them to the compression unit 2. Image data represents the density of each pixel of an image. Image data of a color image contains the data of four color components, that is, C (cyan), M (magenta), Y (yellow), and K (black). Image data of a monochrome image contains the data of K (black). Note that in this embodiment, each of the C, M, Y, and K data is 8-bit data. Image area data represents the attribute of each pixel of an image and will be expressed as Z hereinafter. An attribute is information concerning a pixel and represents that the pixel is included in a photo region or a character region, and has a chromatic color or an achromatic color. In this embodiment, each pixel is constituted by a set of image data and image area data. Hence, a color image has four color image data CMYK and image area data Z, and a monochrome image has one color image data K and image area data Z.

The scanner 3 reads an original using a line sensor with 8,192 pixels arrayed in the main scanning direction, and outputs image data and image area data for each line. More specifically, the scanner 3 sequentially outputs data of 8,192 pixels which constitute one line in synchronism with a transfer clock. Hence, the processing rate of the compression unit 2 connected to the scanner 3 needs to be higher than the transfer rate of image data and image area data output from the scanner 3. The compression unit 2 can receive, from the scanner 3, both image data and image area data of 8,192 pixels which constitute one line and process them sequentially without interruption. The scanner 3 has two operation modes, that is, the CMYKZ mode (color mode) and the KZ mode (monochrome mode) so that the transfer rate of image data and image area data changes depending on the operation mode.

The printer 4 receives image data and image area data sent from the decompression unit 1 and prints them. The printer 4 is a page printer that prints on a page-by-page basis. Hence, the processing rate of the decompression unit 1 needs to be higher than the receiving rate of image data and image area data received by the printer 4 during printing. The printer 4 inputs image data and image area data for each line constituted by 8,192 pixels in synchronism with a transfer clock. The printer 4 has two operation modes, that is, the CMYKZ mode (color mode) and the KZ mode (monochrome mode) so that the receiving rate of image data and image area data changes depending on the operation mode.

The CPU 5 controls the operation of the image processing system based on programs stored in the memory 6. The CPU 5 transmits control signals to the scanner 3, compression unit 2, decompression unit 1, and printer 4, thereby controlling their operations. While the scanner 3 is reading an original, the CPU 5 causes the compression unit 2 to compress the read image data, and transfer the image data to the memory 6 to store it. Compressed image data and compressed image area data stored in the memory 6 may be stored in an HDD 7. To read out the image data, the CPU 5 reads out the compressed image data and compressed image area data from the HDD 7 and stores them in the memory 6. The memory 6 not only stores the programs for the CPU 5 but also serves as the work area of the CPU 5 and the temporary memory of compressed image data and compressed image area data. The HDD 7 receives compressed image data and compressed image area data from the memory 6 and stores them under the control of the CPU 5. The HDD 7 also reads out stored compressed image data and compressed image area data and transfers them to the memory 6. The bus 8 is connected to the decompression unit 1, compression unit 2, CPU 5, memory 6, and HDD 7 to transfer data and control signals between them.

FIG. 2 is a view for explaining the data output rate of the scanner 3 of this embodiment in each operation mode.

As shown in FIG. 2, in the CMYKZ mode, CMYK data of two pixels (eight components) and image area data of two pixels (two components) are output in one transfer clock cycle. In the KZ mode, K data of four pixels (four components) and image area data of four pixels (four components) are output in one transfer clock cycle.

The scanner 3 sequentially transfers data of 8,192 pixels of one line, as described above. Hence, in the CMYKZ mode, the scanner 3 sequentially outputs data of 8,192 pixels of one line in groups of two pixels per cycle. In the KZ mode, the scanner 3 sequentially outputs data of 8,192 pixels of one line in groups of four pixels per cycle. In the CMYKZ mode, 4,096 cycles are necessary for transmitting data of 8,192 pixels of one line. In the KZ mode, 2,048 cycles are necessary for transmitting 8,192 pixels of one line. Note that the data transfer timing will be described later.

FIG. 3 is a view for explaining the data receiving rate of the printer 4 of this embodiment in each operation mode.

As shown in FIG. 3, in the CMYKZ mode, CMYK data of two pixels (eight components) and image area data of two pixels (two components) are receivable in one transfer clock cycle. In the KZ mode, K data of four pixels (four components) and image area data of four pixels (four components) are receivable in one transfer clock cycle. Hence, the data transfer timing in each operation mode is the same as that of the scanner 3 described above. More specifically, in the CMYKZ mode, 4,096 cycles are necessary for receiving 8,192 pixels of one line. In the KZ mode, 2,048 cycles are necessary for receiving 8,192 pixels of one line. Note that the data transfer timing will be described later.

Figure 4:
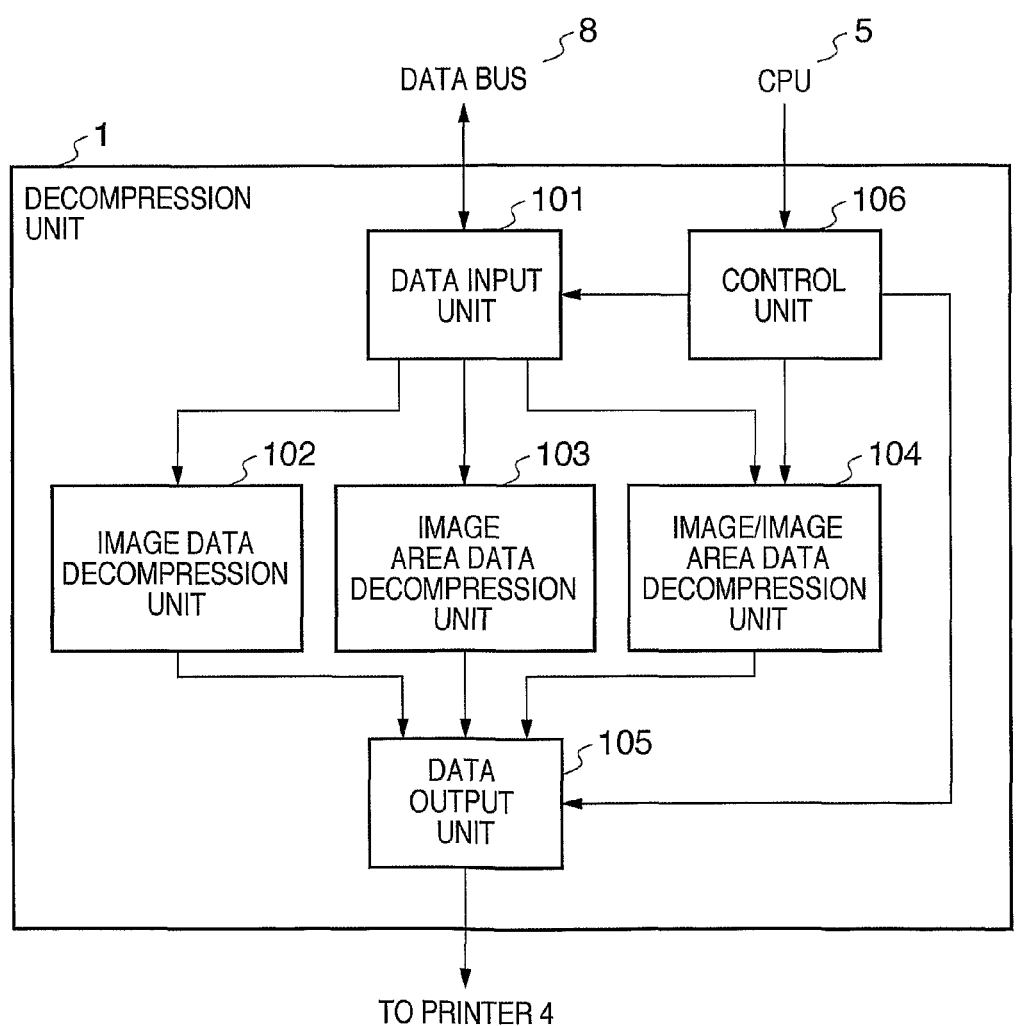
FIG. 4 is a block diagram showing the arrangement of a decompression unit.

FIG. 4 is a block diagram showing the arrangement of the decompression unit 1 according to this embodiment.

A control unit 106 outputs an operation mode switching signal to a data input unit 101, image/image area data decompression unit 104, and data output unit 105 in accordance with a control signal received from the CPU 5, thereby controlling their operations. The data input unit 101 receives, via the bus 8, compressed image data and compressed image area data transferred from the memory 6, and outputs the data to an image data decompression unit 102, image area data decompression unit 103, and image/image area data decompression unit 104. Each of the image data decompression unit 102 and the image area data decompression unit 103 corresponds to a first image processing unit having a fixed image processing capability. The image/image area data decompression unit 104 corresponds to a second image processing unit having a variable image processing capability.

The image data decompression unit 102 decompresses compressed image data received from the data input unit 101 to obtain image data, and outputs the image data to the data output unit 105. The image area data decompression unit 103 decompresses compressed image area data received from the data input unit 101 to obtain image area data, and outputs the image area data to the data output unit 105. The image/image area data decompression unit 104 is hardware such as an FPGA, DSP, or processor whose process can be altered, and can switch its process in accordance with an instruction from the control unit 106. The image data decompression algorithm used by the image/image area data decompression unit 104 to decompress image data is the same as that of the image data decompression unit 102. The data output unit 105 arranges, in the order of pixels of original image data, the image data and/or image area data received from the image data decompression unit 102, image area data decompression unit 103, and image/image area data decompression unit 104 in accordance with the operation mode designated by the control unit 106, and outputs the data to the printer 4.

<CMYKZ Mode (Color Image Data Processing Mode)>

The data input unit 101 transfers, out of received compressed image data, compressed image data of four CMYK components to the image data decompression unit 102. Compressed image data of one component is formed by compressing 64 pixels by JPEG. The data input unit 101 outputs the received compressed image data of four components to the image/image area data decompression unit 104 to realize a distributed decompression process in cooperation with the image data decompression unit 102. This processing is repeated 64 times per line. That is, in the CMYKZ mode (color mode), the capability of the image/image area data decompression unit 104 is switched to the image data decompression capability under the control of the control unit 106 so that the image/image area data decompression unit 104 serves as a compressed image data decompression unit. The input compressed image data is decompressed by the image data decompression unit 102 and the image/image area data decompression unit 104.

The data input unit 101 also outputs received compressed image area data to the image area data decompression unit 103 to decompress the compressed image area data. The data output unit 105 alternately receives the decompressed image data from the image data decompression unit 102 and the image/image area data decompression unit 104 and outputs them to the printer 4. The data output unit 105 also receives the decompressed image area data supplied from the image area data decompression unit 103 and outputs it to the printer 4.

<KZ Mode (Monochrome Image Data Processing Mode)>

The data input unit 101 outputs received compressed image data only to the image data decompression unit 102. The data input unit 101 also outputs received compressed image area data alternately to the image area data decompression unit 103 and the image/image area data decompression unit 104. The capability of the image/image area data decompression unit 104 is switched to the image area data decompression capability under the control of the control unit 106 so that the image/image area data decompression unit 104 outputs, to the data output unit 105, image area data obtained by decompressing the compressed image area data received from the data input unit 101. More specifically, the data input unit 101 transfers compressed image area data of one component to the image area data decompression unit 103 and compressed image area data of one component to the image/image area data decompression unit 104 so that a distributed decompression process can be realized. This processing is repeated 64 times per line. Compressed image area data of one component is formed by compressing 64 pixels by JPEG-LS. Note that the image area data decompression algorithm of the image/image area data decompression unit 104 is the same as that of the image area data decompression unit 103. The data output unit 105 outputs the image data received from the image data decompression unit 102 to the printer 4. The data output unit 105 also alternately receives the image area data from the image area data decompression unit 103 and the image/image area data decompression unit 104 and outputs them to the printer 4.

FIG. 5 is a view for explaining the performance per cycle and gate scale of each of the image data decompression unit 102, image area data decompression unit 103, and image/image area data decompression unit 104 within the decompression unit 1 according to this embodiment.

The capabilities of the image data decompression unit 102 and the image area data decompression unit 103 are fixed. On the other hand, the capability of the image/image area data decompression unit 104 changes under the control of the control unit 106, as described above, and the performance also changes in accordance with the capability. When decompressing image data, the image/image area data decompression unit 104 has decompression performance of one pixel, that is, four components per transfer clock cycle. When decompressing image area data, the image/image area data decompression unit 104 has a decompression performance of two components (two pixels) per transfer clock cycle.

The image/image area data decompression unit 104 exclusively executes the image data decompression capability or the image area data decompression capability. That is, only one capability is executed at a time. The image/image area data decompression unit 104 is hardware whose capability can be altered, as described above. To realize the same capability and performance as those of the image data decompression unit 102 and the image area data decompression unit 103 each having a fixed capability, the image/image area data decompression unit 104 may require a gate scale larger than those of the image data decompression unit 102 and the image area data decompression unit 103.

FIG. 6 is a view for explaining the decompression performance of each data decompression unit and the entire decompression unit 1, in the CMYKZ mode of the decompression unit 1 according to this embodiment.

In the CMYKZ mode, the capability of the image/image area data decompression unit 104 is switched to the image data decompression capability, as described above. Hence, the image/image area data decompression unit 104 has an image data decompression performance of four components (one pixel) per cycle. However, when the capability of the image/image area data decompression unit 104 is switched to the image data decompression capability, the unit 104 has no image area data decompression performance. For this reason, the entire decompression unit 1 has an image data decompression performance of eight components (two pixels) per cycle and an image area data decompression performance of two components (two pixels) per cycle. The performance satisfies the receiving rate of the printer shown in FIG. 3 without any excess in performance.

FIG. 7 is a view for explaining the decompression performance of each data decompression unit and the entire decompression unit 1, in the KZ mode of the decompression unit 1 according to this embodiment.

In the KZ mode, the capability of the image/image area data decompression unit 104 is switched to the image area data decompression capability. Hence, the image/image area data decompression unit 104 has no image data decompression performance and an image area data decompression performance of two components (two pixels) per cycle. For this reason, in the KZ mode, the entire decompression unit 1 has an image data decompression performance of four components (four pixels) per cycle and an image area data decompression performance of four components (four pixels) per cycle. The performance satisfies the receiving rate of the printer 4 shown in FIG. 3 without any excess in performance.

FIG. 8 is a block diagram showing the arrangement of the image data decompression unit 102 within the decompression unit 1 according to this embodiment.

An image component distributing unit 1021 separates compressed image data of four components received from the data input unit 101 sequentially into CMYK data, and distributes them to four image component decompression units 1022 to 1025. The image component decompression units 1022 to 1025 decompress the compressed image data of CMYK components, respectively, and output the generated image data to an image component sorting unit 1026. The image decompression algorithm used by the image component decompression units 1022 to 1025 can be JPEG. Since compressed image data of one component is formed by compressing 64 pixels, image data generated by the decompression process includes 64 pixels per component. Each of the image component decompression units 1022 to 1025 has a processing rate capable of decompressing 64 pixels of one component in 64 cycles. On average, the processing rate allows to process one component per cycle. The image component decompression units 1022 to 1025 can thus decompress one pixel data per cycle.

The image component sorting unit 1026 sorts the pixel data received from the image component decompression units 1022 to 1025 in the order of CMYK, and outputs the data to the data output unit 105. In this case as well, each image component decompression unit outputs decompressed image data of 64 pixels per component, as described above. The image component sorting unit 1026 divides the data into components each corresponding to one pixel, and sorts the data of components from the image component decompression units 1022 to 1025 in order, thereby outputting one pixel data constituted by four components.

In the CMYKZ mode, since CMYK image data are formed by independently compressing the color components, sorting based on the above-described procedure enables to output pixel data in a correct order. In the KZ mode as well, since K image data is formed by compressing four adjacent pixels as independently components, pixel sorting based on the above-described procedure enables to output pixel data in the same order as that of the original image data.

In this way, the image data decompression unit 102 according to this embodiment includes the four image component decompression units 1022 to 1025 and operates them in parallel, thereby implementing processing of decompressing four components (one pixel) per cycle. Note that in the arrangement which improves the processing rate by the parallel processing, the processing rate and the circuit scale of each unit are almost proportional.

Figure 9:
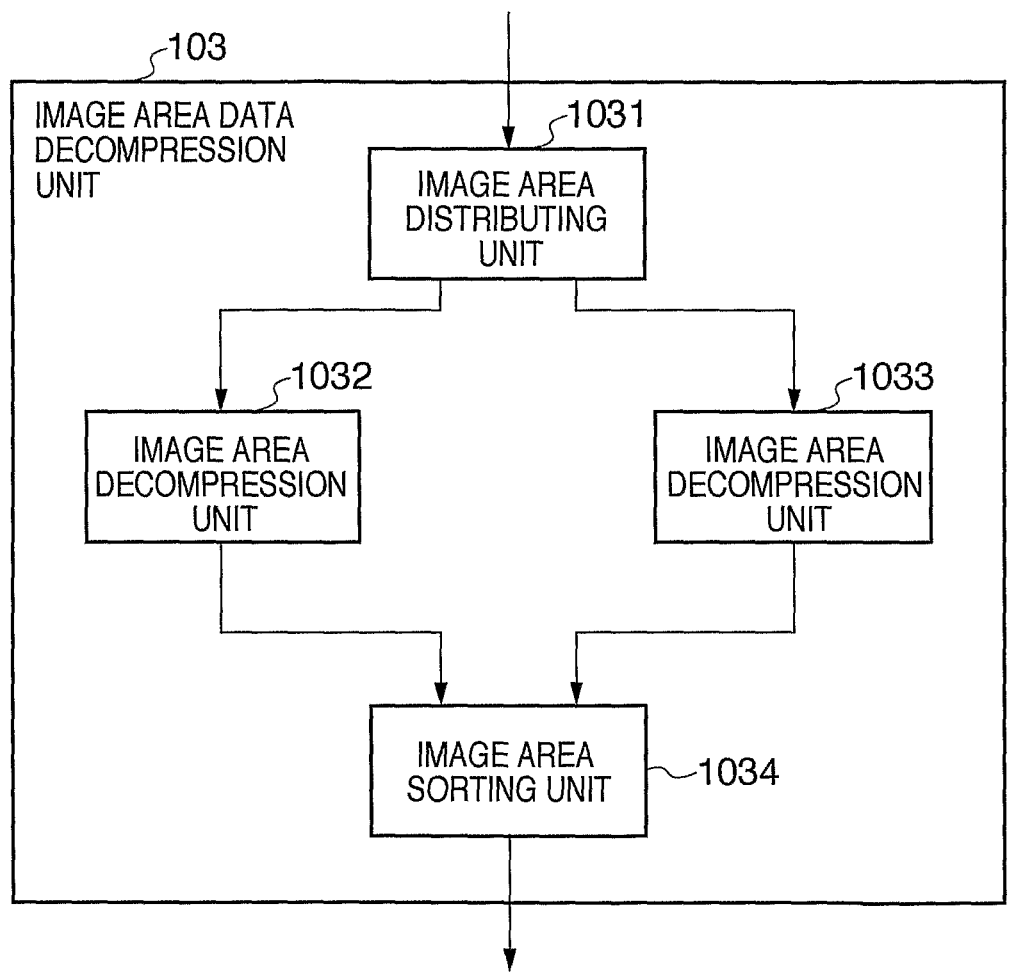
FIG. 9 is a block diagram showing the arrangement of the image area data decompression unit within the decompression unit.

FIG. 9 is a block diagram showing the arrangement of the image area data decompression unit 103 within the decompression unit 1 according to this embodiment.

An image area distributing unit 1031 separates compressed image area data received from the data input unit 101 in order, and distributes them to two image area decompression units 1032 and 1033 in order. The image area decompression units 1032 and 1033 decompress the compressed image area data received from the image area distributing unit 1031, and output the generated image area data to an image area sorting unit 1034. The image area decompression algorithm of the two image area decompression units 1032 and 1033 can be JPEG-LS. Since compressed image area data of one component is formed by compressing 64 pixels, image area data generated by the decompression process includes 64 pixels per component. Each of the image area decompression units 1032 and 1033 has a processing rate capable of decompressing 64 pixels of one component in 64 cycles. On average, the processing rate allows to process one component (image area data of one pixel) per cycle.

The image area sorting unit 1034 sorts the image area data received from the two image area decompression units 1032 and 1033 in order, and outputs the data to the data output unit 105.

As described above, each of the image area decompression units 1032 and 1033 outputs decompressed image area data of 64 pixels per component. The image area sorting unit 1034 alternately receives one component from the image area decompression units 1032 and 1033 as image area data of one pixel, and outputs image area data of two pixels. Since image area data is formed by independently compressing image area data of two adjacent pixels, sorting based on the above-described procedure enables to output pixel data in the same order as that of the original image data.

In this way, the image area data decompression unit 103 includes the two image area decompression units 1032 and 1033 and operates them in parallel, thereby implementing a processing rate of two components (two pixels) per cycle.

Figure 10:
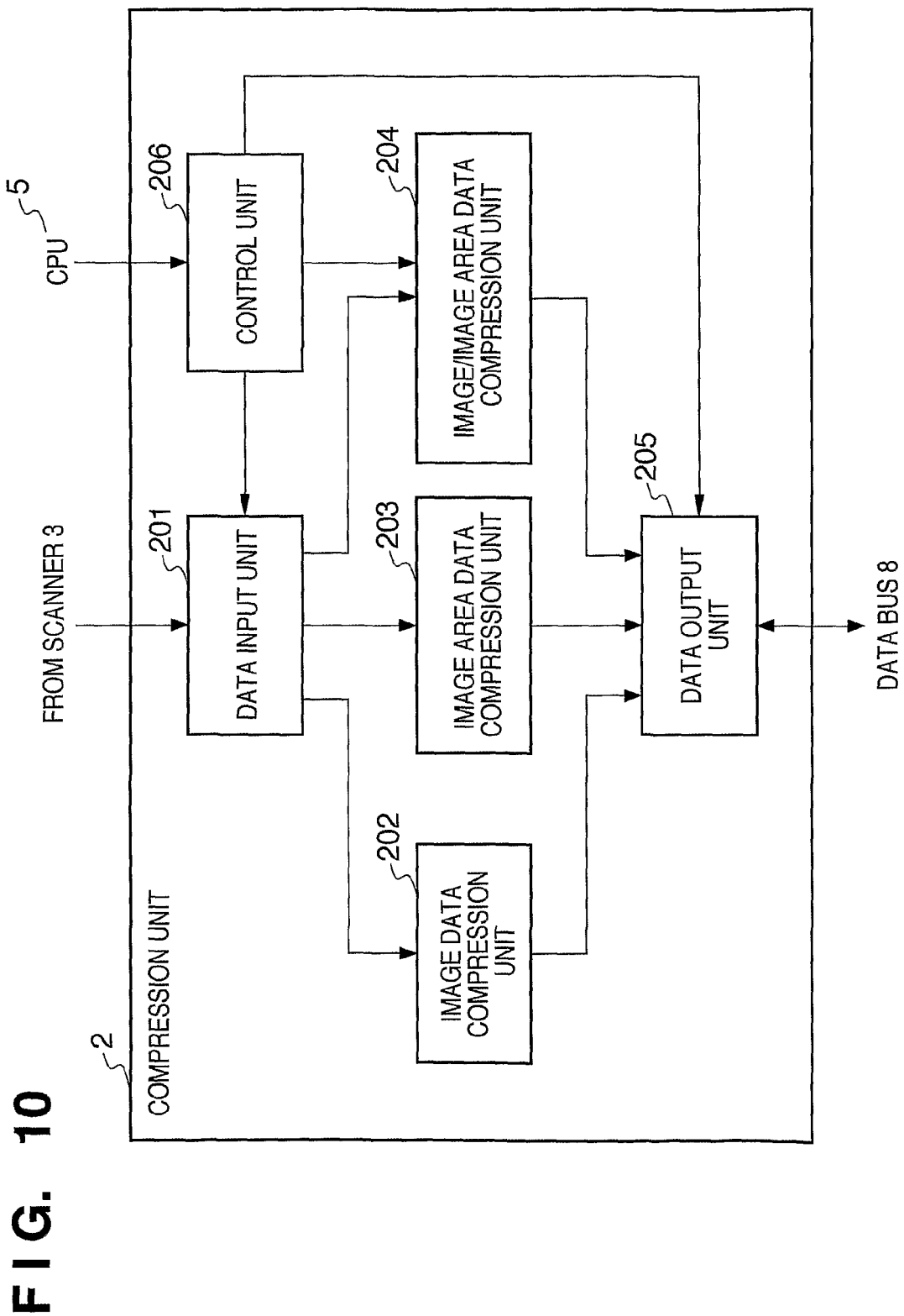
FIG. 10 is a block diagram showing the arrangement of a compression unit.

FIG. 10 is a block diagram showing the arrangement of the compression unit 2 according to this embodiment.

A data input unit 201 receives data transferred from the scanner 3 and containing image data and image area data arranged in pixel order, and outputs the data to an image data compression unit 202, image area data compression unit 203, and image/image area data compression unit 204. The data input unit 201 switches the operation mode under the control of a control unit 206. Each of the image data compression unit 202 and the image area data compression unit 203 corresponds to a first image processing unit having a fixed image processing capability. The image/image area data compression unit 204 corresponds to a second image processing unit having a variable image processing capability.

In the CMYKZ mode, the data input unit 201 outputs image data received from the scanner 3 alternately to the image data compression unit 202 and the image/image area data compression unit 204. In the KZ mode, the data input unit 201 outputs image data received from the scanner 3 only to the image data compression unit 202. In the CMYKZ mode, the data input unit 201 transfers received image area data only to the image area data compression unit 203. In the KZ mode, the data input unit 201 transfers received image area data alternately to the image area data compression unit 203 and the image/image area data compression unit 204.

The image data compression unit 202 compresses image data received from the data input unit 201, and outputs the obtained compressed image data to a data output unit 205. Image data is compressed in groups of 64 pixels per component. Compressed image data obtained by compressing pixel data of one component, that is, 64 pixels is compressed image data of one component.

The compressed image data of one component has a variable data length which changes depending on the contents of image data. The image data compression unit 202 inserts 2-byte markers such as "0xFF" and "0xD0" between the compressed image data of components as delimiters, and then outputs the data. The image area data compression unit 203 compresses image area data received from the data input unit 201, and outputs the obtained compressed image area data to the data output unit 205. Image area data is compressed in groups of 64 pixels per component. Compressed image area data obtained by compressing one component, that is, 64 pixels is compressed image area data of one component. The compressed image area data of one component has a variable data length which changes depending on the contents of original image area data. The image area data compression unit 203 inserts 2-byte markers such as "0xFF" and "0xD0" between the compressed image area data of components as delimiters, and then outputs the data.

The image/image area data compression unit 204 is hardware such as an FPGA, DSP, or processor whose process can be altered, and can switch its capability under the control of the control unit 206. In the CMYKZ mode, the capability of the image/image area data compression unit 204 is switched to the image data compression capability under the control of the control unit 206 so as to output, to the data output unit 205, compressed image data obtained by compressing the image data received from the data input unit 201. This realizes a distributed image data compression process between the image data compression unit 202 and the image/image area data compression unit 204. The algorithm of the image data compression capability in this case is the same as the image data compression algorithm of the image data compression unit 202 to be described later.

In the KZ mode, the capability of the image/image area data compression unit 204 is switched to the image area data compression capability under the control of the control unit 206 so as to output, to the data output unit 205, compressed image area data obtained by compressing the image area data received from the data input unit 201. This realizes a distributed image area data compression process between the image data compression unit 202 and the image/image area data compression unit 204. The algorithm of the image area data compression capability in this case is the same as the image area data compression algorithm of the image area data compression unit 203 to be described later.

The data output unit 205 arranges, in order, the compressed image data and compressed image area data received from the image data compression unit 202, image area data compression unit 203, and image/image area data compression unit 204, and outputs the data to the memory 6 via the bus 8. The data output unit 205 switches the operation mode under the control of the control unit 206. More specifically, in the CMYKZ mode, the data output unit 205 outputs the compressed image data and compressed image area data received from the image data compression unit 202, image/image area data compression unit 204, and image area data compression unit 203 to the memory 6 via the bus 8 in the following order. First, the data output unit 205 outputs the compressed image data of four components from the image data compression unit 202 and then the compressed image area data of one component from the image area data compression unit 203. Next, the data output unit 205 outputs the compressed image data of four components from the image/image area data compression unit 204 and then the compressed image area data of one component from the image area data compression unit 203. This processing is repeated 64 times per line so that the data output unit 205 outputs compressed image data of 4,096 pixels.

In the KZ mode, the data output unit 205 outputs the compressed image data and compressed image area data received from the image data compression unit 202, image area data compression unit 203, and image/image area data compression unit 204 to the memory 6 via the bus 8 in the following order. First, the data output unit 205 outputs the compressed image data of one component from the image data compression unit 202 and then the compressed image area data of one component from the image area data compression unit 203. Next, the data output unit 205 outputs the compressed image data of one component from the image data compression unit 202 and then the compressed image area data of one component from the image/image area data compression unit 204. This processing is repeated 64 times per line so that the data output unit 205 outputs compressed image area data of 4,096 pixels.

The control unit 206 transfers an operation mode switching signal to the data input unit 201, image/image area data compression unit 204, and data output unit 205 in accordance with a control signal received from the CPU 5, thereby controlling them.

FIG. 11 is a view for explaining the performance per cycle and gate scale of each of the image data compression unit 202, image area data compression unit 203, and image/image area data compression unit 204 within the compression unit 2 according to this embodiment.

The capabilities of the image data compression unit 202 and the image area data compression unit 203 are fixed. The image data compression unit 202 has a performance of four components (one pixel) per cycle. The image area data compression unit 203 has a performance of two components (two pixels) per cycle. The capability of the image/image area data compression unit 204 changes under the control of the control unit 206, as described above, and the performance also changes in accordance with the capability. When compressing image data, the image/image area data compression unit 204 has a performance of four components (one pixel) per cycle. When compressing image area data, the image/image area data compression unit 204 has a performance of two components (two pixels) per cycle. The image data compression capability and image area data compression capability of the image/image area data compression unit 204 are exclusive and cannot be executed simultaneously.

The image/image area data compression unit 204 is hardware whose capability can be altered, as described above. To realize the same capability and performance as those of the image data compression unit 202 and the image area data compression unit 203 each having a fixed capability, the image/image area data compression unit 204 may require a gate scale larger than those of them.

FIG. 12 is a view for explaining the compression performance of the data compression units and the entire compression unit 2 in the CMYKZ mode of the compression unit 2 according to this embodiment.

In the CMYKZ mode, the capability of the image/image area data compression unit 204 is switched to the image data compression capability. At this time, the image/image area data compression unit 204 has an image data compression performance of four components (one pixel) per cycle and no image area data compression performance. For this reason, the entire compression unit 2 has an image data compression performance of eight components (two pixels) per cycle in total with the image data compression unit 202 and the image/image area data compression unit 204, and an image area data compression performance of two components (two pixels) per cycle. As can be seen, the performance satisfies the transfer rate of the scanner 3 shown in FIG. 2 without any excess in performance.

FIG. 13 is a view for explaining the compression performance of the data compression units and the entire compression unit 2 in the KZ mode of the compression unit 2 according to this embodiment.

In the KZ mode, the capability of the image/image area data compression unit 204 is switched to the image area data compression capability. Hence, the image/image area data compression unit 204 has no image data compression performance, and an image area data compression performance of two components (two pixels) per cycle. For this reason, the entire compression unit 2 has an image data compression performance of four components (one pixel) per cycle and an image area data compression performance of four components (four pixels) per cycle. As can be seen, the performance satisfies the data transfer rate of the scanner 3 shown in FIG. 2 without any excess in performance.

FIG. 14 is a block diagram showing the arrangement of the image data compression unit 202 within the compression unit 2 according to this embodiment.

An image component distributing unit 2021 separates the image data received from the data input unit 201 into color components, and distributes them to four image component compression units 2022 to 2025. In the CMYKZ mode, "separating image data into color components" means separating CMYK image data into C, M, Y, and K components. In the KZ mode, "separating image data into color components" means separating K image data to the (4×i+0)th pixel, (4×i+1)th pixel, (4×i+2)th pixel, and (4×i+3)th pixel (i is an integer; $0 \leq i \leq 2047$) from the start of a line. That is, in the KZ mode, K image data of one component is regarded as image data of four components for convenience and separated into four parts.

Each of the image component compression units 2022 to 2025 compresses the image data of one component received from the image component distributing unit 2021, and outputs the generated compressed image data to an image component sorting unit 2026. The image compression algorithm of the four image component compression units 2022 to 2025 can be JPEG. Image data is compressed in groups of 64 pixels per component. Compressed image data to be output is a compressed code obtained by compressing image data of 64 pixels per component together. Each image component compression unit has a processing rate capable of compressing image data of 64 pixels per component in 64 cycles. On average, image data of one component can be compressed per cycle.

The image component sorting unit 2026 acquires, one by one for each component, the compressed image data received from the four image component compression units 2022 to 2025, sorts the data, and outputs it to the data output unit 205. In this way, the image data compression unit 202 includes the four image component compression units 2022 to 2025 and operates them in parallel, thereby implementing a data compression rate of four components (one pixel) per cycle. This parallel processing enables to improve the processing rate. The processing rate and the gate scale are supposed to be almost proportional.

Figure 15:
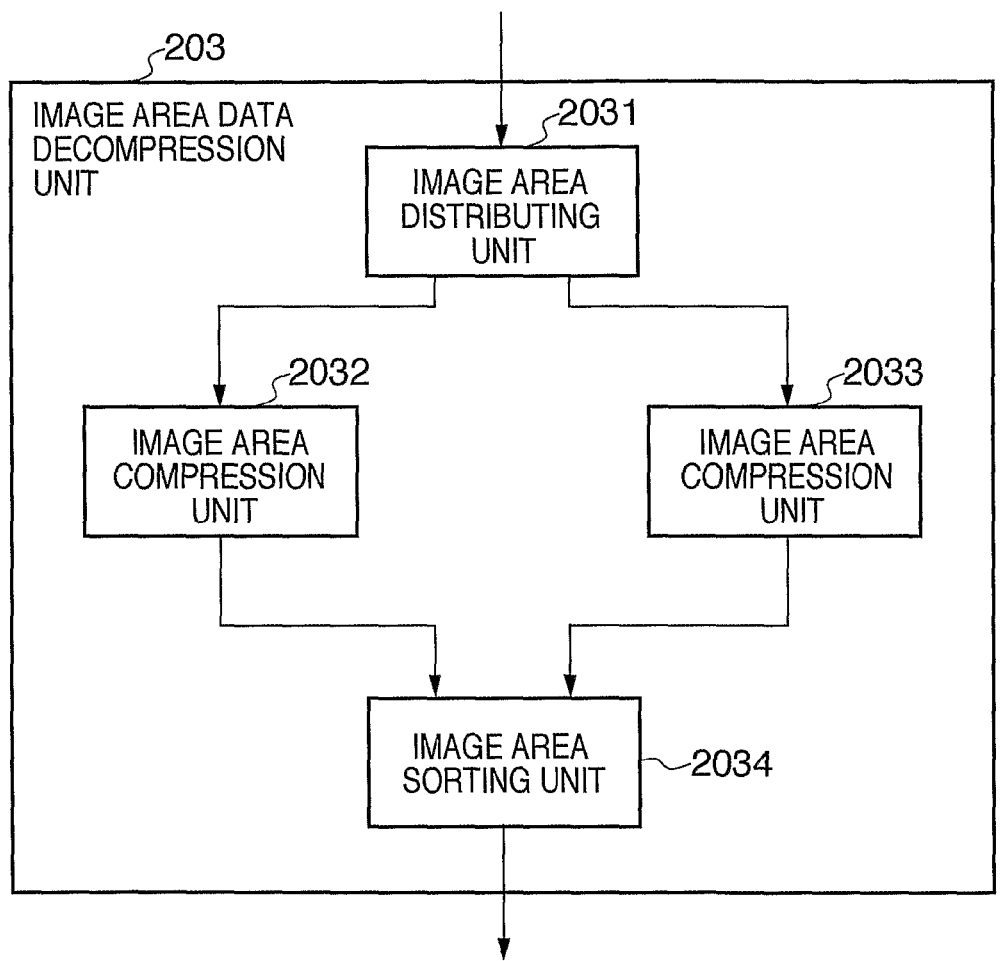
FIG. 15 is a block diagram showing the arrangement of the image area data compression unit.

FIG. 15 is a block diagram showing the arrangement of the image area data compression unit 203 within the compression unit 2 according to this embodiment.

An image area distributing unit 2031 separates image area data received from the data input unit 201 into components, and distributes them to two image area compression units 2032 and 2033 in order. "Separating image area data into components" means separating image area data Z to the (2×i+0)th pixel and the (2×i+1)th pixel (i is an integer; $0 \leq i \leq 4095$) from the start of a line. That is, the image area data Z containing only one component is regarded as image area data of two components for convenience and is separated.

Each of the image area compression units 2032 and 2033 compresses the image area data of one component received from the image area distributing unit 2031, and outputs the generated compressed image area data to an image area sorting unit 2034. The image area compression algorithm of the two image area compression units 2032 and 2033 can be JPEG-LS. Compressed image area data to be output is a compressed code obtained by compressing image area data of 64 pixels per component together. Each of the image area compression units 2032 and 2033 has a processing rate capable of compressing 64 pixels per component in 64 cycles. That is, each image area compression unit has a processing rate of one component (one pixel) per cycle on average.

The image area sorting unit 2034 alternately sorts the compressed image area data received from the two image area compression units 2032 and 2033 for each component obtained by compressing 64 pixels per component, and outputs the data to the data output unit 205.

In this way, the image area data compression unit 203 includes the two image area compression units 2032 and 2033 and operates them in parallel, thereby implementing a processing rate of two components (two pixels) per cycle.

FIG. 16 is a timing chart showing the timing of image data/image area data output from the scanner 3 to the compression unit 2 in the CMYKZ mode of the image processing system according to this embodiment. FIG. 16 also shows the timing of image data/image area data output from the decompression unit 1 to the printer 4 in the CMYKZ mode.

Referring to FIG. 16, "clock" represents a transfer clock. Data of two pixels (eight components) is transferred per transfer clock cycle in synchronism with the clock. Hence, data of 8,192 pixels which constitute one line is transferred with 4,096 cycles of transfer clock. Image data transferred per cycle is 64-bit data formed from CMYK data each corresponding to two pixels. Image area data transferred per cycle is 16-bit data corresponding to two pixels. That is, the total of data bits is 80. Note that in FIG. 16, C0, M0, Y0, and K0 indicate CMYK data of the first pixel, and Z0 indicates image area data corresponding to the first pixel. Second to 8192nd pixels are expressed in the same way. The 80-bit data is represented by data[79:0]. In addition, "enable" is a signal representing the data is effective. These also apply to the following timing charts.

FIGS. 17A to 17C are timing charts for explaining the timings of image data transfer from the data input unit 201 to the data compression units in the CMYKZ mode of the compression unit 2 according to this embodiment. These timing charts also represent the timings of image data transfer from the image data decompression units to the data output unit 105 in the CMYKZ mode of the decompression unit 1 according to this embodiment.

FIG. 17A shows the timing of image data transfer from the data input unit 201 to the image data compression unit 202 in FIG. 10. FIG. 17A also shows the timing of image data transfer from the image data decompression unit 102 to the data output unit 105 in FIG. 4 in the CMYKZ mode of the decompression unit 1 according to this embodiment.

CMYK data of one pixel is transferred per transfer clock (clock), cycle in synchronism with the clock. As described above, in the CMYKZ mode, the data input unit 201 alternately outputs image data to the image data compression unit 202 and the image/image area data compression unit 204. For this reason, the data transferred to the image data compression unit 202 is ½ of the pixel data of one line, that is, 4,096 pixels. Hence, the data input unit 201 sequentially transfers data of 4,096 pixels per line to the image data compression unit 202. The number of transfer cycles for the pixel data of one line is 4,096.

FIG. 17B shows the timing of image data transfer from the data input unit 201 to the image/image area data compression unit 204 in FIG. 10. FIG. 17B also shows the timing of image data transfer from the image/image area data decompression unit 104 to the data output unit 105 in FIG. 4 in the CMYKZ mode of the decompression unit 1 according to this embodiment.

FIG. 17C shows the timing of image area data transfer from the data input unit 201 to the image area data compression unit 203 in FIG. 10. FIG. 17C also shows the timing of image area data transfer from the image area data decompression unit 103 to the data output unit 105 in FIG. 4 in the CMYKZ mode of the decompression unit 1 according to this embodiment.

Image area data of two pixels is transferred per transfer clock (clock) cycle, in synchronism with the clock. As described above, in the CMYKZ mode, the data input unit 201 transfers image area data only to the image area data compression unit 203. For this reason, the transferred data to the image area data compression unit 203 corresponds to 8,192 pixels, that is an entire line. Hence, data of 8,192 pixels per line is sequentially transferred, and the number of transfer cycles per line is 4,096.

FIGS. 18A to 18D are timing charts showing the timings of image data transfer from the image component distributing unit 2021 to the image component compression units in FIG. 14 in the CMYKZ mode of the image data compression unit 202 within the compression unit 2 according to this embodiment.

FIGS. 18A to 18D also show the timings of image data transfer from the image component decompression units to the image component sorting unit 1026 in FIG. 8 in the CMYKZ mode of the image data decompression unit 102 according to this embodiment.

FIG. 18A shows the timing of transfer of image data of C component from the image component distributing unit 2021 to the image component compression unit 2022 in FIG. 14. The image data of C component is sent to the image component compression unit 2022 and compressed. FIG. 18A also shows the timing of transfer of image data of C component from the image component decompression unit 1022 to the image component sorting unit 1026 in FIG. 8.

FIG. 18B shows the timing of transfer of image data of M component from the image component distributing unit 2021 to the image component compression unit 2023 in FIG. 14. The image data of M component is sent to the image component compression unit 2023 and compressed. FIG. 18B also shows the timing of transfer of image data of M component from the image component decompression unit 1023 to the image component sorting unit 1026 in FIG. 8.

FIG. 18C shows the timing of transfer of image data of Y component from the image component distributing unit 2021 to the image component compression unit 2024 in FIG. 14. The image data of Y component is sent to the image component compression unit 2024 and compressed. FIG. 18C also shows the timing of transfer of image data of Y component from the image component decompression unit 1024 to the image component sorting unit 1026 in FIG. 8.

FIG. 18D shows the timing of transfer of image data of K component from the image component distributing unit 2021 to the image component compression unit 2025 in FIG. 14. The image data of K component is sent to the image component compression unit 2025 and compressed. FIG. 18D also shows the timing of transfer of image data of K component from the image component decompression unit 1025 to the image component sorting unit 1026 in FIG. 8.

FIGS. 19A to 19D are timing charts showing the timings of compressed image data transfer from the image component compression units to the image component sorting unit 2026 (FIG. 14) in the CMYKZ mode of the image data compression unit 202 within the compression unit 2 according to this embodiment. FIGS. 19A to 19D also show the timings of compressed image data transfer from the image component distributing unit 1021 to the image component decompression units (FIG. 8) in the CMYKZ mode of the image data decompression unit 102 according to this embodiment.

Figures 19A, 19B, 19C, 19D:
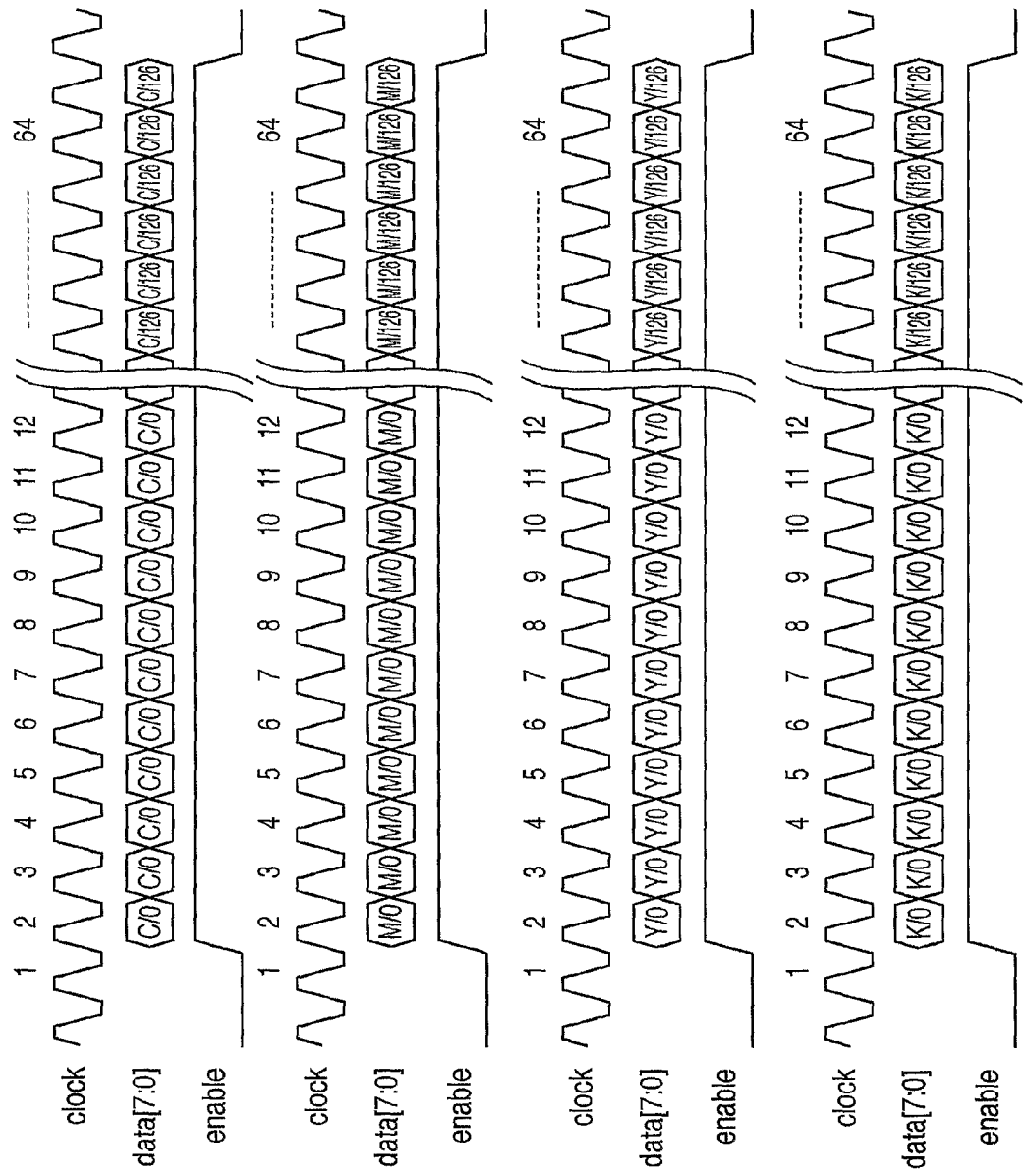
FIGS. 19A, 19B, 19C, and 19D are timing charts showing the timings of compressed image data transfer from the image component compression units to an image component sorting unit in the CMYKZ mode of the image data compression unit.

FIG. 19A shows the timing of transfer of compressed image data of C component (represented by C/) from the image component compression unit 2022 to the image component sorting unit 2026 in FIG. 14. FIG. 19A also shows the timing of transfer of compressed image data of C component from the image component distributing unit 1021 to the image component decompression unit 1022 in FIG. 8.

FIG. 19B shows the timing of transfer of compressed image data of M component (represented by M/) from the image component compression unit 2023 to the image component sorting unit 2026 in FIG. 14. FIG. 19B also shows the timing of transfer of compressed image data of M component from the image component distributing unit 1021 to the image component decompression unit 1023.

FIG. 19C shows the timing of transfer of compressed image data of Y component (represented by Y/) from the image component compression unit 2024 to the image component sorting unit 2026 in FIG. 14. FIG. 19C also shows the timing of transfer of compressed image data of Y component from the image component distributing unit 1021 to the image component decompression unit 1024 in FIG. 8.

FIG. 19D shows the timing of transfer of compressed image data of K component (represented by K/) from the image component compression unit 2025 to the image component sorting unit 2026 in FIG. 14. FIG. 19D also shows the timing of transfer of compressed image data of K component from the image component distributing unit 1021 to the image component decompression unit 1025 in FIG. 8.

FIGS. 20A and 20B are timing charts showing the timings of image area data transfer from the image area distributing unit 2031 to the image area compression units in FIG. 15 in the CMYKZ mode of the image area data compression unit 203 within the compression unit 2 according to this embodiment. FIGS. 20A and 20B also show the timings of image area data transfer from the image area decompression units to the image area sorting unit 1034 in FIG. 9 in the CMYKZ mode of the image data decompression unit 102 according to this embodiment.

FIG. 20A shows the timing of image area data transfer from the image area distributing unit 2031 to the image area compression unit 2032 in FIG. 15. FIG. 20A also shows the timing of image area data transfer from the image area decompression unit 1032 to the image area sorting unit 1034 in FIG. 9.

FIG. 20B shows the timing of image area data transfer from the image area distributing unit 2031 to the image area compression unit 2033 in FIG. 15. FIG. 20B also shows the timing of image area data transfer from the image area decompression unit 1033 to the image area sorting unit 1034 in FIG. 9.

FIGS. 21A and 21B are timing charts showing the timings of compressed image area data transfer from the image area compression units to the image area sorting unit 2034 in FIG. 15 in the CMYKZ mode of the image area data compression unit 203 within the compression unit 2 according to this embodiment. FIGS. 21A and 21B are timing charts also showing the timings of compressed image area data transfer from the image area distributing unit 1031 to the image area decompression units in FIG. 9 in the CMYKZ mode of the image area data decompression unit 103 according to this embodiment.

FIG. 21A shows the timing of transfer of compressed image area data (represented by Z/) from the image area compression unit 2032 to the image area sorting unit 2034 in FIG. 15. FIG. 21A also shows the timing of compressed image area data transfer from the image area distributing unit 1031 to the image area decompression unit 1032 in FIG. 9.

FIG. 21B shows the timing of transfer of compressed image area data (represented by Z/) from the image area compression unit 2033 to the image area sorting unit 2034 in FIG. 15. FIG. 21B also shows the timing of compressed image area data transfer from the image area distributing unit 1031 to the image area decompression unit 1033 in FIG. 9.

FIGS. 22A to 22C are timing charts showing the timings of compressed data transfer from the data compression units to the data output unit 205 in the CMYKZ mode of the compression unit 2 (FIG. 10) according to this embodiment. FIGS. 22A to 22C also show the timings of compressed data transfer from the data input unit 101 to the data decompression units in the CMYKZ mode of the decompression unit 1 (FIG. 4) according to this embodiment.

FIG. 22A shows the timing of compressed image data transfer from the image data compression unit 202 to the data output unit 205. FIG. 22A also shows the timing of compressed image data transfer from the data input unit 101 to the image data decompression unit 102 in FIG. 4.

FIG. 22B shows the timing of compressed image data transfer from the image/image area data compression unit 204 to the data output unit 205 in FIG. 10. FIG. 22B also shows the timing of compressed image data transfer from the data input unit 101 to the image/image area data decompression unit 104 in FIG. 4.

FIG. 22C shows the timing of compressed image area data transfer from the image area data compression unit 203 to the data output unit 205 in FIG. 10. FIG. 22C also shows the timing of compressed image area data transfer from the data input unit 101 to the image area data decompression unit 103 in FIG. 4.

FIG. 23 is a timing chart showing the timing of compressed image data/compressed image area data transfer from the compression unit 2 to the memory 6 in the CMYKZ mode of the image processing system according to this embodiment. FIG. 23 also shows the timing of compressed image data/compressed image area data transfer from the memory 6 to the decompression unit 1 in the CMYKZ mode.

Sixteen-byte (128-bit) data is transferred per transfer clock cycle in synchronism with the clock.

Compressed code data includes compressed image data components and compressed image area data components corresponding to 64 pixels, which are delimited by 2-byte markers "0xFF" and "0xD0". Referring to FIG. 23, "C/0" represents the 0th compressed image data of C component; "M/0", the 0th compressed image data of M component; "Y/0", the 0th compressed image data of Y component; and "K/0", the 0th compressed image data of K component. "Z/0" represents the 0th compressed image area data. First to 127th compressed image data and compressed image area data corresponding to one line are expressed in the same way.

Figure 24:
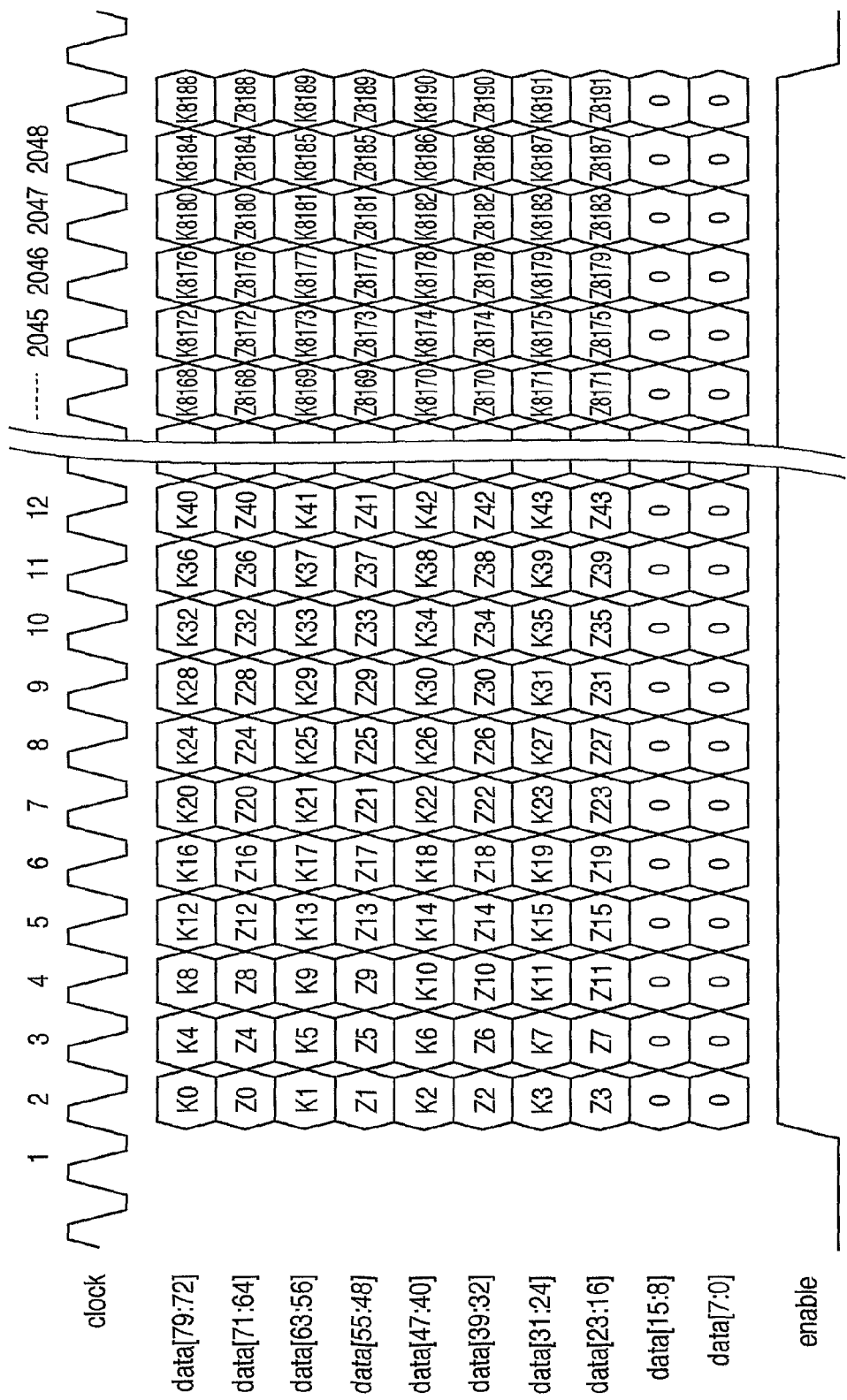
FIG. 24 is a timing chart showing the timing of image data/image area data transfer from the scanner to the compression unit in the KZ mode.

FIG. 24 is a timing chart showing the timing of image data/image area data transfer from the scanner 3 to the compression unit 2 in the KZ mode of the image processing system according to this embodiment. FIG. 24 also shows the timing of image data/image area data transfer from the decompression unit 1 to the printer 4 in the KZ mode.

Data of four pixels is transferred per transfer clock (clock) cycle in synchronism with the clock. In addition, data of 8,192 pixels per line is sequentially transferred. Hence, the number of transfer cycles per line is 2,048. Image data transferred per cycle is 80-bit data which is represented by data [79:0]. Four sets of image data and image area data which constitute one pixel are transferred per cycle. Hence, data transferred per cycle is data of four pixels. Image data contains only the K (black) component, and image area data contains one component Z. Note that a fixed value "0" is set in 16-bit data represented by data[15:0] in each cycle.

FIGS. 25A to 25C are timing charts showing the timings of image data/image area data transfer from the data input unit 201 to the data compression units in FIG. 10 in the KZ mode of the compression unit 2 according to this embodiment. FIGS. 25A to 25C also show the timings of image data/image area data transfer from the data decompression units to the data output unit 105 in FIG. 4 in the KZ mode of the decompression unit 1. Data of 8,192 pixels per line is sequentially transferred. Hence, the number of transfer cycles per line is 2,048.

FIG. 25A shows the timing of transfer of image data of K component from the data input unit 201 to the image data compression unit 202 in FIG. 10. FIG. 25A also shows the timing of transfer of image data of K component from the image data decompression unit 102 to the data output unit 105 in FIG. 4. As described above, in the KZ mode, the data input unit 201 transfers image data only to the image data compression unit 202. For this reason, the data transferred to the image data compression unit 202 corresponds to 8,192 pixels that is an entire line. Data of four pixels is transferred per transfer clock (clock) cycle in synchronism with the clock.

FIG. 25B shows the timing of image area data transfer from the data input unit 201 to the image/image area data compression unit 204 in FIG. 10. FIG. 25B also shows the timing of image area data transfer from the image/image area data decompression unit 104 to the data output unit 105 in FIG. 4. Image area data of two pixels is transferred per cycle in synchronism with the clock.

As described above, in the KZ mode, the data input unit 201 alternately transfers image area data to the image area data compression unit 203 and the image/image area data compression unit 204. For this reason, the data transferred to the image/image area data compression unit 204 is ½ of the pixel data of the entire line, that is, 4,096 pixels. Hence, data of 4,096 pixels per line is sequentially transferred, and the number of transfer cycles per line is 2,048.

FIG. 25C shows the timing of image area data transfer from the data input unit 201 to the image area data compression unit 203 in FIG. 10. FIG. 25C also shows the timing of image area data transfer from the image area data decompression unit 103 to the data output unit 105 in FIG. 4. Image area data of two pixels is transferred per cycle in synchronism with the clock.

As described above, in the KZ mode, the data input unit 201 alternately transfers image area data to the image area data compression unit 203 and the image/image area data compression unit 204. For this reason, the data transferred to the image area data compression unit 203 is ½ of the pixel data of the entire line, that is, 4,096 pixels. Hence, data of 4,096 pixels per line is sequentially transferred, and the number of transfer cycles per line is 2,048. In this case, a fixed value "0" is set in 16-bit data represented by data[15:0].

FIGS. 26A to 26D are timing charts showing the timings of transfer of one pixel image data of K component from the image component distributing unit 2021 to the image component compression units in the KZ mode of the image data compression unit 202 within the compression unit 2 according to this embodiment. FIGS. 26A to 26D also show the timings of transfer of one pixel image data transfer of K component from the image component decompression units to the image component sorting unit 1026 in the KZ mode of the decompression unit 1.

FIG. 26A shows the timing of transfer of image data of K component from the image component distributing unit 2021 to the image component compression unit 2022 in FIG. 14. FIG. 26A also shows the timing of transfer of image data of K component from the image component decompression unit 1022 to the image component sorting unit 1026.

FIG. 26B shows the timing of transfer of image data of K component from the image component distributing unit 2021 to the image component compression unit 2023 in FIG. 14. FIG. 26B also shows the timing of transfer of image data of K component from the image component decompression unit 1023 to the image component sorting unit 1026 in FIG. 8.

FIG. 26C shows the timing of transfer of image data of K component from the image component distributing unit 2021 to the image component compression unit 2024 in FIG. 14. FIG. 26C also shows the timing of transfer of image data of K component from the image component decompression unit 1024 to the image component sorting unit 1026 in FIG. 8.

FIG. 26D shows the timing of transfer of image data of K component from the image component distributing unit 2021 to the image component compression unit 2025 in FIG. 14. FIG. 26D also shows the timing of transfer of image data of K component from the image component decompression unit 1025 to the image component sorting unit 1026 in FIG. 8.

FIGS. 27A to 27D are timing charts showing the timings of transfer of compressed image data of K component from the image component compression units to the image component sorting unit 2026 in FIG. 14 in the KZ mode of the image data compression unit 202 within the compression unit 2 according to this embodiment. FIGS. 27A to 27D also show the timings of transfer of compressed image data of K component from the image component distributing unit 1021 to the image component decompression units in FIG. 8.

FIG. 27A shows the timing of transfer of compressed image data of K component (K/) from the image component compression unit 2022 to the image component sorting unit 2026 in FIG. 14. FIG. 27A also shows the timing of transfer of compressed image data of K component from the image component distributing unit 1021 to the image component decompression unit 1022.

FIG. 27B shows the timing of transfer of compressed image data of K component from the image component compression unit 2023 to the image component sorting unit 2026 in FIG. 14. FIG. 27B also shows the timing of transfer of compressed image data of K component from the image component distributing unit 1021 to the image component decompression unit 1023 in FIG. 8.

FIG. 27C shows the timing of transfer of compressed image data of K component from the image component compression unit 2024 to the image component sorting unit 2026 in FIG. 14. FIG. 27C also shows the timing of transfer of compressed image data of K component from the image component distributing unit 1021 to the image component decompression unit 1024 in FIG. 8.

FIG. 27D shows the timing of transfer of compressed image data of K component from the image component compression unit 2025 to the image component sorting unit 2026 in FIG. 14. FIG. 27D also shows the timing of transfer of compressed image data of K component from the image component distributing unit 1021 to the image component decompression unit 1025 in FIG. 8.

FIGS. 28A and 28B are timing charts showing the timings of image area data transfer from the image area distributing unit 2031 to the image area compression units in the KZ mode of the image area data compression unit 203 in FIG. 15. FIGS. 28A and 28B are timing chart also showing the timings of image area data transfer from the image area decompression units to the image area sorting unit 1034 in the KZ mode of the image area data decompression unit 103 in FIG. 9.

FIG. 28A shows the timing of image area data transfer from the image area distributing unit 2031 to the image area compression unit 2032 in FIG. 15. FIG. 28A also shows the timing of image area data transfer from the image area decompression unit 1032 to the image area sorting unit 1034 in FIG. 9.

FIG. 28B shows the timing of image area data transfer from the image area distributing unit 2031 to the image area compression unit 2033 in FIG. 15. FIG. 28B also shows the timing of image area data transfer from the image area decompression unit 1033 to the image area sorting unit 1034 in FIG. 9.

FIGS. 29A and 29B are timing charts showing the timings of compressed image area data transfer from the image area compression units to the image area sorting unit 2034 in the KZ mode of the image area data compression unit 203 (FIG. 15) according to this embodiment. FIGS. 29A and 29B also show the timings of compressed image area data transfer from the image area distributing unit 1031 to the image area decompression units in the KZ mode of the image area data decompression unit 103 (FIG. 9) according to this embodiment.

FIG. 29A shows the timing of compressed image area data transfer from the image area compression unit 2032 to the image area sorting unit 2034. FIG. 29A also shows the timing of compressed image area data transfer from the image area distributing unit 1031 to the image area decompression unit 1032 in FIG. 9.

FIG. 29B shows the timing of compressed image area data transfer from the image area compression unit 2033 to the image area sorting unit 2034 in FIG. 15. FIG. 29B also shows the timing of compressed image area data transfer from the image area distributing unit 1031 to the image area decompression unit 1033 in FIG. 9.

FIGS. 30A to 30C are timing charts showing the timings of compressed data transfer from the data compression units to the data output unit 205 in the KZ mode of the compression unit 2 according to this embodiment. FIGS. 30A to 30C are timing charts also showing the timings of compressed data transfer from the data input unit 101 to the data decompression units in FIG. 4 in the KZ mode of the decompression unit 1 according to this embodiment.

FIG. 30A shows the timing of transfer of compressed image data of K component from the image data compression unit 202 to the data output unit 205 in FIG. 10. FIG. 30A also shows the timing of transfer of compressed image data of K component from the data input unit 101 to the image data decompression unit 102 in FIG. 4.

FIG. 30B shows the timing of compressed image area data transfer from the image/image area data compression unit 204 to the data output unit 205 in FIG. 10. FIG. 30B also shows the timing of compressed image area data transfer from the data input unit 101 to the image/image area data decompression unit 104 in FIG. 4.

FIG. 30C shows the timing of compressed image area data transfer from the image area data compression unit 203 to the data output unit 205 in FIG. 10. FIG. 30C also shows the timing of compressed image area data transfer from the data input unit 101 to the image area data decompression unit 103 in FIG. 4.

Figure 31:
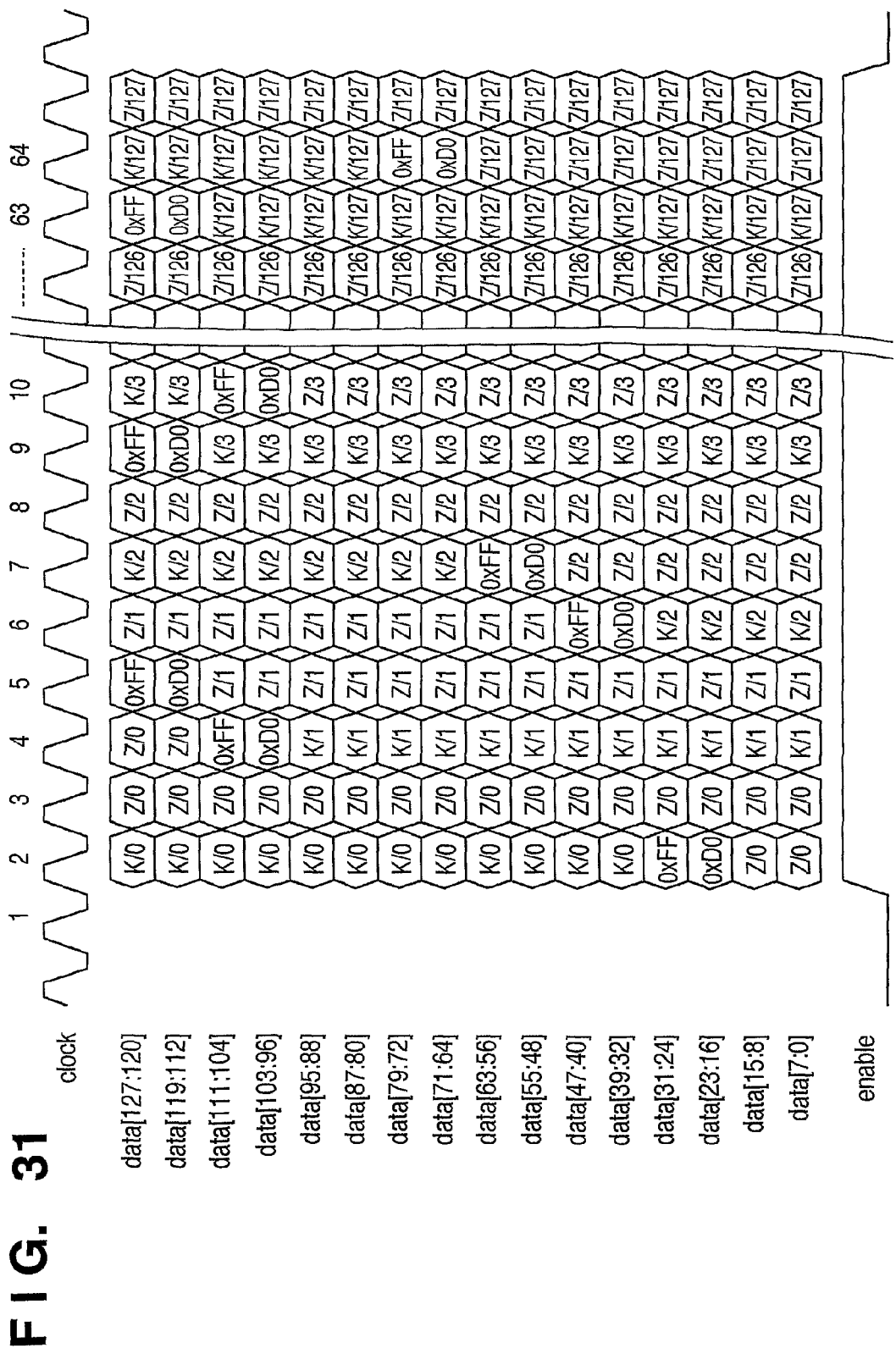
FIG. 31 is a timing chart showing the timing of compressed image data/compressed image area data transfer from the compression unit to the memory in the KZ mode.

FIG. 31 is a timing chart showing the timing of compressed image data/compressed image area data transfer from the compression unit 2 to the memory 6 in the KZ mode of the image processing system according to this embodiment. FIG. 31 also shows the timing of compressed image data/compressed image area data transfer from the memory 6 to the decompression unit 1 in the KZ mode.

In this case as well, data transfer is done while the enable signal is at high level. Sixteen-byte data is transferred per transfer clock cycle in synchronism with the clock. Compressed code data includes compressed image data components and compressed image area data components corresponding to 64 pixels, which are delimited by 2-byte markers "0xFF" and "0xD0". "K/0" represents the 0th compressed image data of K component; and "Z/0", the 0th compressed image area data. The remaining compressed image data of K component and compressed image area data are expressed in the same way.

The operation of the entire image processing system having the above-described arrangement will be described below.

The CMYKZ mode will be described first.

The CPU 5 transmits, to the decompression unit 1, compression unit 2, scanner 3, and printer 4, a control signal to switch the operation mode to the CMYKZ mode. The operation mode of the decompression unit 1, compression unit 2, scanner 3, and printer 4 thus changes to the CMYKZ mode. At this time, the decompression unit 1 switches the capability of the image/image area data decompression unit 104 to the image data decompression capability under the control of the control unit 106 (FIG. 4). The compression unit 2 switches the capability of the image/image area data compression unit 204 to the image data compression capability under the control of the control unit 206 (FIG. 10).

Next, the CPU 5 instructs the scanner 3 to start scan. The scanner 3 starts reading an original, and outputs image data and image area data to the compression unit 2 at the timing shown in FIG. 16. The compression unit 2 receives the image data and image area data via the data input unit 201 (FIG. 10). The data input unit 201 separates the image data and image area data into the separated image data and the separated image area data at the timings shown in FIGS. 17A to 17C, and supplies the image data to the image data compression unit 202 and the image/image area data compression unit 204 and the image area data to the image area data compression unit 203. The image data compression unit 202 receives the image data via the image component distributing unit 2021, as shown in FIG. 17A. The image component distributing unit 2021 (FIG. 14) divides the received image data and supplies the divided image data to the image component compression units 2022 to 2025, as shown in FIGS. 18A to 18D.

The image component compression unit 2022 compresses the received image data by JPEG to generate compressed image data of C component shown in FIG. 19A, and outputs it to the image component sorting unit 2026. The image component compression unit 2023 compresses the received image data by JPEG to generate the compressed image data shown in FIG. 19B, and outputs it to the image component sorting unit 2026. The image component compression unit 2024 compresses the received image data by JPEG to generate the compressed image data shown in FIG. 19C, and outputs it to the image component sorting unit 2026. The image component compression unit 2025 compresses the received image data by JPEG to generate the compressed image data shown in FIG. 19D, and outputs it to the image component sorting unit 2026. The image component sorting unit 2026 sorts the compressed image data of C, M, Y, and K components in the order of color components of the original image data to generate the compressed image data shown in FIG. 22A, and outputs it to the data output unit 205.

The image/image area data compression unit 204 compresses the image data shown in FIG. 17B, which is supplied from the data input unit 201, by the same method as that of the image data compression unit 202 to generate the compressed image data shown in FIG. 22B, and outputs it to the data output unit 205.

The image area data compression unit 203 receives the image area data shown in FIG. 17C, which is supplied from the data input unit 201, via the image area distributing unit 2031 (FIG. 15). The image area distributing unit 2031 divides the image area data into image area data as shown in FIGS. 20A and 20B, and outputs them to the image area compression units 2032 and 2033. The image area compression unit 2032 compresses the received image area data by JPEG-LS to generate the compressed image area data shown in FIG. 21A, and outputs it to the image area sorting unit 2034. The image area compression unit 2033 compresses the received image area data by JPEG-LS to generate the compressed image area data shown in FIG. 21B, and outputs it to the image area sorting unit 2034. The image area sorting unit 2034 sorts these compressed image area data in the above-described way to generate compressed image area data shown in FIG. 22C, and outputs it to the data output unit 205.

The data output unit 205 receives the compressed image data and compressed image area data, sorts them in the above-described way to generate the compressed image data and compressed image area data shown in FIG. 23, and transfers them to the memory 6 via the bus 8. The CPU 5 transfers the compressed image data and compressed image area data shown in FIG. 23, which are thus stored in the memory 6, to the HDD 7 for storage.

Decompressing of the thus stored compressed image data and compressed image area data will be explained next.

The CPU 5 reads out the compressed image data and compressed image area data shown in FIG. 23 from the HDD 7, stores them in the memory 6, and then outputs them to the decompression unit 1. The decompression unit 1 receives the compressed image data and compressed image area data via the data input unit 101. The data input unit 101 separates the received compressed image data and compressed image area data into separated compressed image data and separated compressed image area data, as shown in FIGS. 22A to 22C. The data input unit 101 supplies the compressed image data to the image data decompression unit 102 and the image/image area data decompression unit 104 and the compressed image area data to the image area data decompression unit 103.

The image data decompression unit 102 receives the supplied compressed image data shown in FIG. 22A via the image component distributing unit 1021 (FIG. 8). The image component distributing unit 1021 divides the supplied compressed image data into compressed image data, as shown in FIGS. 19A to 19D, and supplies them to the image component decompression units 1022 to 1025. The image component decompression unit 1022 decompresses the received compressed image data by JPEG to generate the image data shown in FIG. 18A, and outputs it to the image component sorting unit 1026. The image component decompression unit 1023 decompresses the received compressed image data by JPEG to generate the image data shown in FIG. 18B, and outputs it to the image component sorting unit 1026. The image component decompression unit 1024 decompresses the received compressed image data by JPEG to generate the image data shown in FIG. 18C, and outputs it to the image component sorting unit 1026. The image component decompression unit 1025 decompresses the received compressed image data by JPEG to generate the image data shown in FIG. 18D, and outputs it to the image component sorting unit 1026. The image component sorting unit 1026 sorts the image data of the components in the above-described way to generate the image data shown in FIG. 17A, and outputs it to the data output unit 105. The image/image area data decompression unit 104 decompresses the received compressed image data shown in FIG. 22B by the same method as that of the image data decompression unit 102 to generate the image data shown in FIG. 17B, and outputs it to the data output unit 105.

The image area data decompression unit 103 receives the input compressed image area data shown in FIG. 22C via the image area distributing unit 1031 (FIG. 9). The image area distributing unit 1031 divides the received compressed image area data into compressed image area data as shown in FIGS. 21A and 21B, and outputs them to the image area decompression units 1032 and 1033. The image area decompression unit 1032 decompresses the received compressed image area data by JPEG-LS to generate the image area data shown in FIG. 20A, and supplies it to the image area sorting unit 1034. The image area decompression unit 1033 decompresses the received compressed image area data by JPEG-LS to generate the image area data shown in FIG. 20B, and outputs it to the image area sorting unit 1034. The image area sorting unit 1034 sorts the received image area data in the above-described way to generate the image area data shown in FIG. 17C, and outputs it to the data output unit 105. The data output unit 105 sorts the image data and image area data in the above-described way to generate the image data and image area data shown in FIG. 16, and outputs them to the printer 4. The printer 4 receives and prints the image data and image area data.

The KZ mode will be described next.

The CPU 5 transmits, to the decompression unit 1, compression unit 2, scanner 3, and printer 4, a control signal to switch the operation mode to the KZ mode. The operation mode of the decompression unit 1, compression unit 2, scanner 3, and printer 4 thus switches to the KZ mode. At this time, the decompression unit 1 switches the capability of the image/image area data decompression unit 104 to the image area data decompression capability under the control of the control unit 106 (FIG. 4). The compression unit 2 switches the capability of the image/image area data compression unit 204 to the image area data compression capability under the control of the control unit 206 (FIG. 10).

Next, the CPU 5 instructs the scanner 3 to start scan. The scanner 3 starts reading an original, and outputs image data and image area data to the compression unit 2, as shown in FIG. 24. The compression unit 2 receives the image data and image area data shown in FIG. 24 via the data input unit 201. The data input unit 201 separates the received image data and image area data into image data and image area data, as shown in FIGS. 25A to 25C, and outputs the data to the image data compression unit 202, image/image area data compression unit 204, and image area data compression unit 203. The image data compression unit 202 receives the image data shown in FIG. 25A via the image component distributing unit 2021 (FIG. 14).

The image component distributing unit 2021 divides the received image data into image data shown in FIGS. 26A to 26D, and outputs them to the image component compression units 2022 to 2025. The image component compression unit 2022 compresses the received image data by JPEG to generate the compressed image data shown in FIG. 27A, and outputs it to the image component sorting unit 2026. The image component compression unit 2023 compresses the received image data by JPEG to generate the compressed image data shown in FIG. 27B, and outputs it to the image component sorting unit 2026. The image component compression unit 2024 compresses the received image data by JPEG to generate the compressed image data shown in FIG. 27C, and outputs it to the image component sorting unit 2026. The image component compression unit 2025 compresses the received image data by JPEG to generate the compressed image data shown in FIG. 27D, and outputs it to the image component sorting unit 2026. The image component sorting unit 2026 sorts these received compressed image data in the above-described way to generate the compressed image data shown in FIG. 30A, and outputs it to the data output unit 205.

The image area data compression unit 203 receives the image area data shown in FIG. 25C, which is supplied from the data input unit 201, via the image area distributing unit 2031 (FIG. 15). The image area distributing unit 2031 divides the received image area data into image area data shown in FIGS. 28A and 28B, and outputs them to the image area compression units 2032 and 2033. The image area compression unit 2032 compresses the received image area data by JPEG-LS to generate the compressed image area data shown in FIG. 29A, and outputs it to the image area sorting unit 2034. The image area compression unit 2033 compresses the received image area data by JPEG-LS to generate the compressed image area data shown in FIG. 29B, and outputs it to the image area sorting unit 2034. The image area sorting unit 2034 sorts these compressed image area data in the above-described way to generate compressed image area data shown in FIG. 30C, and outputs it to the data output unit 205.

The image/image area data compression unit 204 compresses the image area data shown in FIG. 25B, which is received from the data input unit 201, by the same method as that of the image area data compression unit 203 to generate the compressed image area data shown in FIG. 30B, and outputs it to the data output unit 205.

The data output unit 205 sorts the received compressed image data and compressed image area data in the above-described way to generate the compressed image data and compressed image area data shown in FIG. 31, and transfers them to the memory 6 via the bus 8 for storage. The CPU 5 causes the HDD 7 to store the compressed image data and compressed image area data shown in FIG. 31, which are stored in the memory 6. When printing the image data, the CPU 5 reads out the compressed image data and compressed image area data shown in FIG. 31 from the HDD 7, temporarily stores them in the memory 6, and outputs them to the decompression unit 1.

The decompression unit 1 receives the transferred compressed image data and compressed image area data shown in FIG. 31 via the data input unit 101 (FIG. 4). The data input unit 101 separates the received compressed image data and compressed image area data into compressed image data and compressed image area data shown in FIGS. 30A to 30C, and outputs them to the image data decompression unit 102, image/image area data decompression unit 104, and image area data decompression unit 103. The image data decompression unit 102 receives the compressed image data shown in FIG. 30A via the image component distributing unit 1021 (FIG. 8). The image component distributing unit 1021 divides the compressed image data into compressed image data shown in FIGS. 27A to 27D, and outputs them to the image component decompression units 1022 to 1025. The image component decompression unit 1022 decompresses the received compressed image data by JPEG to generate the image data shown in FIG. 26A, and outputs it to the image component sorting unit 1026. The image component decompression unit 1023 decompresses the received compressed image data by JPEG to generate the image data shown in FIG. 26B, and outputs it to the image component sorting unit 1026. The image component decompression unit 1024 decompresses the received compressed image data by JPEG to generate the image data shown in FIG. 26C, and outputs it to the image component sorting unit 1026. The image component decompression unit 1025 decompresses the received compressed image data by JPEG to generate the image data shown in FIG. 26D, and outputs it to the image component sorting unit 1026. The image component sorting unit 1026 sorts these image data in the above-described way to generate the image data shown in FIG. 25A, and outputs it to the data output unit 105.

Image area data decompression will be described next.

The image area data decompression unit 103 receives the transferred compressed image area data shown in FIG. 30C via the image area distributing unit 1031 (FIG. 9). The image area distributing unit 1031 divides the received compressed image area data into the compressed image area data shown in FIGS. 29A and 29B, and outputs them to the image area decompression units 1032 and 1033. The image area decompression unit 1032 decompresses the received compressed image area data by JPEG-LS to generate the image area data shown in FIG. 28A, and outputs it to the image area sorting unit 1034. The image area decompression unit 1033 decompresses the received compressed image area data by JPEG-LS to generate the image area data shown in FIG. 28B, and outputs it to the image area sorting unit 1034. The image area sorting unit 1034 sorts the received image area data in the above-described way to generate the image area data shown in FIG. 25C, and outputs it to the data output unit 105.

The image/image area data decompression unit 104 decompresses the transferred compressed image area data shown in FIG. 30B by the same method as that of the image area data decompression unit 103 to generate the image area data shown in FIG. 25B, and outputs it to the data output unit 105. The data output unit 105 sorts the received image data and image area data in the above-described way to generate the image data and image area data shown in FIG. 24, and outputs them to the printer 4. The printer 4 prints an image based on the image data and image area data received from the decompression unit 1.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-052556, filed Mar. 5, 2009 which is hereby incorporated by reference herein in its entirety.

The invention claimed is:

1. An image processing apparatus comprising:
a first image processing unit configured to have a fixed image processing function to perform image processing of image data;
a second image processing unit configured to have a fixed image processing function to perform image processing of image area data;
a reconfigurable image processing unit configured to be capable of having selectively, by reconfiguration of an architecture of the reconfigurable image processing unit, one of least a first image processing function for image processing of image data and a second image processing function for image processing of image area data; and
a control unit configured to reconfigure the architecture of the reconfigurable image processing unit to have one of at least the first image processing function for image processing of the image data and a second image processing function for image processing of the image area data on a basis of whether the image processing apparatus processes a color image or a monochrome image, and to control the first image processing unit, the second image processing unit, and the reconfigurable image processing unit, wherein the control unit is further configured:
if the image processing apparatus processes a color image, to reconfigure the architecture of the reconfigurable image processing unit to have the first image processing function, to control both the first image processing unit and the reconfigurable image processing unit to perform image processing of image data of the color image, and to control the second image processing unit to perform image processing of image area data of the color image, and
if the image processing apparatus processes a monochrome image, to reconfigure the architecture of the reconfigurable image processing unit to have the second image processing function to control the first image processing unit to perform image processing of image data of the monochrome image, and to control both the second image processing unite and the reconfigurable image processing unit to perform image processing of image area data of the monochrome image.

2. The image processing apparatus according to claim 1, wherein the first image processing unit, the second image processing unit, and the reconfigurable image processing unit are configured to perform decompression processing of data.

3. The image processing apparatus according to claim 1, wherein the first image processing unit, the second image processing unit, and the reconfigurable image processing unit configured to perform compression processing of data.

4. The image processing, apparatus according to claim 1, further comprising an obtaining unit configured to obtain imaged data and image area data to be processed.

5. The image processing apparatus according to claim 1, further comprising an output unit configured to output image data and image area data which has been processed.

6. The image processing apparatus according to claim 1, further comprising a reading unit configured to read an image.

7. The image processing apparatus according to claim 1, further comprising a print unit configured to print an image.

8. The image processing apparatus according to claim 1, wherein:
the second image processing unit is further configured to have a fixed image processing function to perform image processing of the image area data which indicates, for each pixel, an attribute of a pixel different from a density of the pixel; and
the reconfigurable image processing unit is further configured to have a changeable image processing among a plurality of image processing functions including an image processing function to perform image processing of the image data and an image processing function to perform image processing of the image area data which indicates, for each pixel, an attribute of a pixel different from a density of the pixel, based on whether the image processing apparatus processes a color image or a monochrome image.

9. The image processing apparatus according to claim 1, wherein the reconfigurable image processing unit is a field programmable gate array.

10. The image processing apparatus according to claim 1, where an image processing algorithm in the first image processing function realized by the reconfiguration of the architecture of the reconfigurable image processing unit is the same as an image processing algorithm in the fixed image processing function of the first image processing unit.

11. The image processing apparatus according to claim 1, wherein an image processing algorithm in the second image processing function realized by the reconfiguration of the architecture of the reconfigurable image processing unit is the same as an image processing algorithm in the fixed image processing function of the second image processing unit.

12. An image processing method comprising:
controlling a first image processing unit configured to have a fixed image processing function to perform image processing of image data, a second image processing unit configured to have a fixed image processing function to perform image processing of image area data, and a reconfigurable image processing unit to perform image processing of image data or image processing of image area data, wherein the reconfiguration image processing unit is configured to be capable of having selectively, by reconfiguration of an architecture of the reconfigurable image processing unit based on whether the image processing apparatus processes a color image or a monochrome image, one of at least a first image processing function for image processing of image data and a second image processing function for image processing of image area data;
if the image processing apparatus processes a color image, reconfiguring the architecture of the reconfigurable image processing unit to have the first image processing function, controlling both the first image processing unit and the reconfigurable image processing unit to perform image processing of image data of the color image, and controlling the second image processing unit to perform the image processing of image area data of the color image; and
if the image processing apparatus processes a monochrome image, reconfiguring the architecture of the reconfigurable image processing unit to have the second image processing function controlling the first image processing unit to perform image processing of image data of the monochrome image, and controlling both the second image processing unit and the reconfigurable image processing unit to perform image processing of image area data of the monochrome image.

13. A non-transitory computer-readable medium storing a program for instructing a computer to perform:
controlling a first image processing unit configured to have a fixed image processing function to perform image processing of image data, a second image processing unit configured to have a fixed image processing function to perform image processing of image area data, and a reconfigurable image processing unit to perform image processing of image data or image processing of image area data, wherein the reconfigurable image processing of the reconfigurable image processing unit is configured to be capable of having selectively, by reconfiguration of an architecture of the reconfigurable image processing unit based on whether the image processing apparatus processes a color image or a monochrome image, one of at least a first image processing function for image processing of image data and a second image processing function for image processing of image area data;
if the image processing apparatus processes a color image, reconfiguring the architecture of the reconfigurable image processing unit to have the first image processing function, controlling both the first image processing unit and the reconfigurable image processing unit to perform image processing of image data of the color image, and controlling the second image processing unit to perform the image processing of image area data of the color image; and
if the image processing apparatus processes a monochrome image, reconfiguring the architecture of the reconfigurable image processing unit to have the second image processing function controlling the first image processing unit to perform image processing of image data of the monochrome image, and controlling both the second image processing unite and the reconfigurable image processing unit to perform image processing of image area data of the monochrome image.

* * * * *